(12) United States Patent
Gehani et al.

(10) Patent No.: US 8,907,957 B2
(45) Date of Patent: Dec. 9, 2014

(54) AUTOMATIC ANIMATION GENERATION

(75) Inventors: Samir Gehani, Cupertino, CA (US);
Tyler C. Rayner, San Jose, CA (US)

(73) Assignee: Apple Inc., Cupertino, CA (US)

( * ) Notice: Subject to any disclaimer, the term of this patent is extended or adjusted under 35 U.S.C. 154(b) by 299 days.

(21) Appl. No.: 13/221,287

(22) Filed: Aug. 30, 2011

(65) Prior Publication Data

US 2013/0050224 A1    Feb. 28, 2013

(51) Int. Cl.
*G06T 13/00* (2011.01)
*G06T 13/80* (2011.01)

(52) U.S. Cl.
CPC ........................ *G06T 13/80* (2013.01)
USPC ............................. 345/473; 345/592; 345/619

(58) Field of Classification Search
CPC ......... G06T 13/40; G06T 13/00; G06T 13/80; G06T 13/20; G06T 11/60; G06T 19/00; G06T 11/00; G06F 9/4443; G06F 3/0481; G06F 17/30017; G06F 17/24; G11B 27/034; G11B 27/34; G11B 17/24
USPC .......................................... 345/473, 592, 619
See application file for complete search history.

(56) References Cited

U.S. PATENT DOCUMENTS

| | | | |
|---|---|---|---|
| 5,359,712 A | 10/1994 | Cohen et al. | |
| 5,636,340 A | 6/1997 | Bonneau et al. | |
| 5,659,793 A * | 8/1997 | Escobar et al. | 715/202 |
| 5,692,117 A | 11/1997 | Berend et al. | |
| 5,929,867 A | 7/1999 | Herbstman et al. | |
| 5,963,203 A | 10/1999 | Goldberg et al. | |
| 5,999,195 A | 12/1999 | Santangeli | |
| 6,469,711 B2 | 10/2002 | Foreman et al. | |
| 6,504,545 B1 | 1/2003 | Browne et al. | |
| 6,512,522 B1 | 1/2003 | Miller et al. | |
| 6,747,650 B2 | 6/2004 | Turner et al. | |
| 6,828,971 B2 | 12/2004 | Uesaki et al. | |
| 6,867,787 B1 | 3/2005 | Shimizu et al. | |
| 6,947,044 B1 | 9/2005 | Kulas | |
| 6,956,574 B1 | 10/2005 | Cailloux et al. | |
| 7,199,805 B1 | 4/2007 | Langmacher et al. | |
| 7,336,264 B2 | 2/2008 | Cajolet et al. | |
| 7,336,280 B2 | 2/2008 | Nelson et al. | |
| 7,483,041 B2 | 1/2009 | Langmacher et al. | |
| 7,594,180 B1 | 9/2009 | Langmacher et al. | |
| 7,643,037 B1 | 1/2010 | Langmacher et al. | |
| 2002/0015050 A1 | 2/2002 | Kawai et al. | |
| 2003/0146915 A1 | 8/2003 | Brook et al. | |
| 2005/0231512 A1* | 10/2005 | Niles et al. | 345/473 |

(Continued)

OTHER PUBLICATIONS

U.S. Appl. No. 13/231,762, filed Sep. 13, 2011, Gehani, Samir, et al.

(Continued)

*Primary Examiner* — Maurice L McDowell, Jr.
(74) *Attorney, Agent, or Firm* — Novak Druce Connolly Bove + Quigg LLP

(57) ABSTRACT

Some embodiments of the invention provide a method that receives a selection of an animation to apply to two or more graphical objects in a scene over a particular time duration. The method identifies parameters for each of the graphical objects. Based on the selected animation, the method generates modifications to at least one parameter for each of the graphical objects over the particular time duration. The parameter of a first graphical object is modified differently than the parameter of a second graphical object. The method stores the modifications as data for the scene.

27 Claims, 15 Drawing Sheets

(56) References Cited

U.S. PATENT DOCUMENTS

| | | | |
|---|---|---|---|
| 2006/0152511 A1* | 7/2006 | Whatmough | 345/473 |
| 2007/0146388 A1* | 6/2007 | Langmacher et al. | 345/619 |
| 2007/0159487 A1 | 7/2007 | Felt | |
| 2008/0072166 A1 | 3/2008 | Reddy | |
| 2009/0309881 A1* | 12/2009 | Zhao et al. | 345/473 |
| 2010/0064222 A1 | 3/2010 | Tilton | |
| 2010/0107079 A1 | 4/2010 | Langmacher et al. | |
| 2010/0201692 A1 | 8/2010 | Niles et al. | |

OTHER PUBLICATIONS

U.S. Appl. No. 13/231,767, filed Sep. 13, 2011, Gehani, Samir, et al.

U.S. Appl. No. 13/231,770, filed Sep. 13, 2011, Gehani, Samir, et al.

Author Uknown, "LiveType 2: User Manual", Month Unknown, 2005, pp. 1-157, Apple Inc., USA.

Author Unknown, "Using Adobe Flash CS4 Professional," Updated Mar. 5, 2009, 474 pages, Adobe Systems Incorporated, San Jose, California, USA.

Author Unknown, "Adobe Director 11: User Guide," Month Unknown, 2008, 498 pages, Adobe Systems Incorporated, San Jose, California, USA.

Author Unknown, "Adobe Premiere Pro CS3: Classroom in a Book", Month Unknown, 2008, Chapters 9 and 10, 27 pages, Adobe Systems Incorporated, San Jose, California USA.

Jones, Jerry, "India Pro Special Effects Titler," The Ken Stone Index, Software Review, Apr. 1, 2002, pp. 1-18, USA.

Spencer, Mark, "Working with Keyframes in Motion, Part 1: Creating and Manipulating Keyframes," The Ken Stone Index, Feb. 11, 2005, pp. 1-7, USA.

Stone, Ken, "The Basics—Editing with Transitions in Final Cut Pro," The Ken Stone Index, Jun. 12, 2001, pp. 1-8, USA.

Stone, Ken, "Motion Paths and the Bezier Handle in FCP," The Ken Stone Index, Aug. 13, 2001, pp. 1-11, USA.

Stevenson, Nancy, et al., "Special Edition—Using Microsoft PowerPoint 97," Month Unknown, 1997, 18 pages, Que Corporation, Indianapolis, USA.

\* cited by examiner

AUTOMATIC ANIMATION GENERATION

BACKGROUND

Smartphone applications (or "apps") have increased dramatically in popularity, with many programmers, both amateur and professional, in the business of developing such apps. These applications will often contain graphical objects that move around on the screen, and all of this movement has to be programmed by the app developer. To get an object to move off the screen, the developer needs to specifically program that when a particular condition occurs, the object moves in a particular direction from its particular location. Similarly, objects need to be scaled, distorted, rotated, changed in appearance, etc. Given the amount of such animation found in many such apps (games, for example), a simpler way of programming such animation is needed.

BRIEF SUMMARY

Some embodiments of the invention provide a method for generating animation information for animatable objects in a computer-generated scene. The method identifies parameters for the animatable objects and computes modifications to at least one parameter for the animatable objects over a time duration for the animation. Based on the animation, the method modifies the parameters of a first object differently than the parameters of a second object.

In some embodiments, a first application for developing a second application generates the animation for use in the second application (e.g., an interactive game, an office application, etc.). The animatable objects of some embodiments include graphical objects as well as some non-graphical objects. The graphical objects include items associated with the second application, such as icons, textual information, movies or other media, or other items. Within the second application, the graphical objects might be selectable items or just items that are displayed. The first application could also generate the animation for reasons other than use in development of a second application, such as creating animated fonts, creating animations simply for viewing, etc. While this document primarily refers to graphical objects, one of ordinary skill will recognize that the animatable items of some embodiments include audio, vibration emissions on a touch device, etc.

The user of the first application (i.e., the developer of the second application) creates scenes in which one or more graphical objects are displayed. Through the user interface of the first application, the developer modifies various parameters of the objects over the duration of the scene. In some embodiments, each graphical object has several parameters (e.g., position, size, rotation, and opacity parameters). These parameters may be modified either directly (e.g., by the developer typing in values or interacting with user interface controls) or automatically through animations.

To apply an animation to a set of graphical objects, in some embodiments the user selects a particular animation and the set of objects (e.g., all of the graphical objects in the scene or a subset thereof). Animations may include intro animations (e.g., all of the selected objects moving from the outside of the scene inwards), outro animations (e.g., all of the objects fading out), or mid-scene animations (e.g., the objects changing positions within a scene). The selected animation includes instructions on how to modify the various parameters of the selected objects. For instance, the animations might change the position of the different objects based on the relation of the objects to a location in the scene, to each other, etc. In some cases, the animation calculates a first parameter for an object based on the value of a second parameter of the object (e.g., larger objects moving more slowly).

Some embodiments generate the animations as a set of keyframes for the graphical objects in the scene. That is, the application computes particular values for the different parameters of each object at various times over the duration of the scene. These keyframe values are stored, and the values can be interpolated for the parameters between the keyframes.

In some embodiments, when the application generating the animation is an app-building application, the developer associates the scene (which may include just the generated animation or additional object behaviors) with a particular action in the developed application. For instance, a selection of one of the graphical objects might cause that graphical object and/or the other graphical objects to animate.

In addition to animations within a scene, some embodiments automatically generate animations for transitions between scenes. A first scene might include a first set of graphical objects, while a second scene includes a second set of graphical objects (which may all be the same as the first set, may all be different, or may be partially the same and partially different). When a user (e.g., developer) indicates that the first scene should transition into the second scene, some embodiments automatically generate this transition as a set of parameter changes (e.g., keyframes).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details, examples and embodiments are set forth for purpose of explanation. However, one of ordinary skill in the art will realize that the invention is not limited to the embodiments set forth and that the invention may be practiced without some of the specific details and examples discussed. In other instances, well-known structures and devices are shown in block diagram form in order not to obscure the description of the invention with unnecessary detail.

Some embodiments of the invention provide a method for generating animation information for animatable objects in a computer-generated scene. The method identifies parameters for the animatable objects and computes modifications to at least one parameter for the animatable objects over a time duration for the animation. Based on the animation, the method modifies the parameters of a first object differently than the parameters of a second object. The animatable objects of some embodiments include graphical objects as well as some non-graphical objects. While this document primarily refers to graphical objects, one of ordinary skill will recognize that the animatable items of some embodiments include audio, vibration emissions on a touch device, etc.

Figure 1:
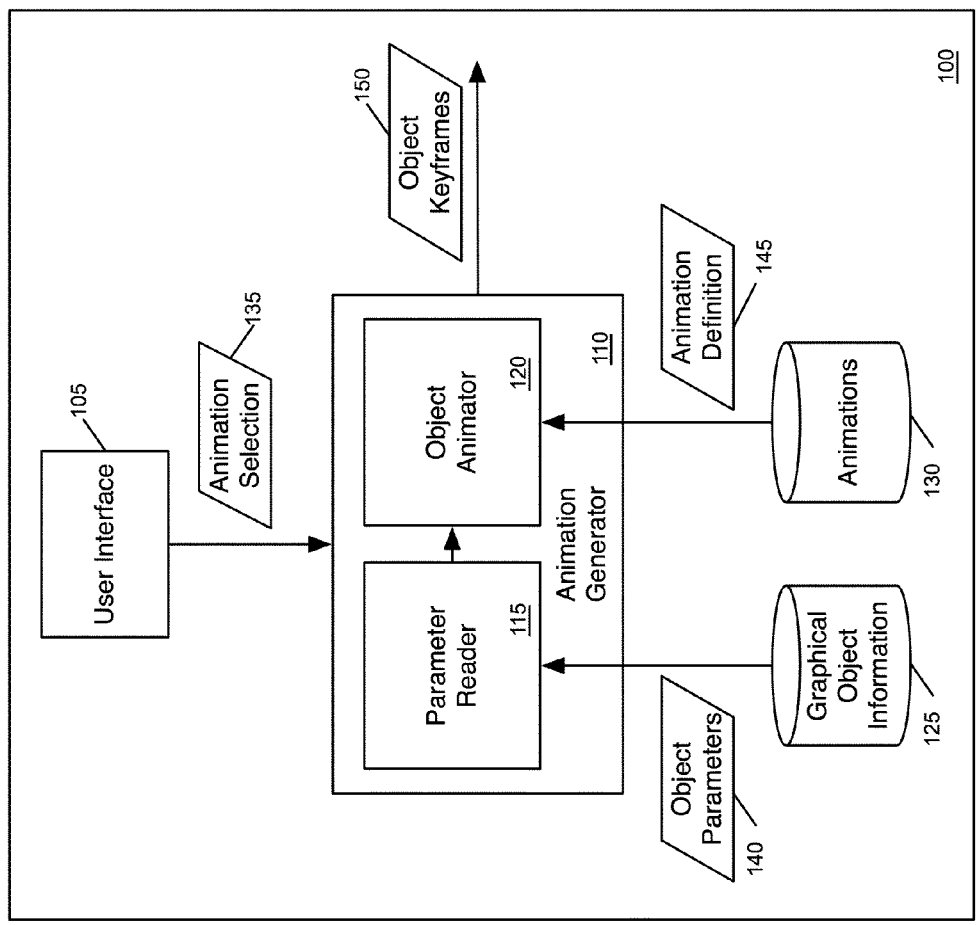
FIG. 1 conceptually illustrates an application for performing automated animation generation.

FIG. 1 conceptually illustrates an application 100 for performing such automated animation generation. In some embodiments, the application 100 is a first application for developing a second application, and generates the animation for use in the second application. The second application might be an interactive game, an office application, etc. In some embodiments, the first application is used to develop applications for specific devices (e.g., specific smartphones, tablets, laptops or desktops, etc.) or specific operating systems (which may run on specific devices such as smartphones, tablets, laptops, desktops, etc.). The application 100 could generate the animation for other reasons in some embodiments, such as creating animated fonts, creating animations simply for viewing, creating web-based content (e.g., hardware-accelerated CCS and JavaScript-driven HTML5 for advertisements and other such content), etc.

As shown, the application 100 includes a user interface 105 and an animation generator 110. The animation generator 110 includes both a parameter reader 115 and an object animator 120. The application 100 also stores graphical object information 125 and animation information 130.

The graphical object information 125 stores information about the different graphical objects in a scene. The user of the application 100 (e.g., an application developer) creates scenes in which one or more graphical objects are displayed. The graphical objects of some embodiments may include various items, such as icons, textual information, movies or other media, etc. Within a second application developed using the application 100, these might appear as selectable items or just displayed items.

The graphical object information 125 of some embodiments includes a set of parameters for each graphical object in a scene. These parameters may be inherent to the object or modified by a user through the user interface 105. The user may also modify the parameters of the objects over the duration of the scene. In some embodiments, the graphical objects each have position, size, rotation, and opacity parameters, as well as other parameters. These parameters may be modified either directly (e.g., by the developer typing in values or interacting with user interface controls) or automatically through animations.

The animations information 130 stores information for one or more pre-determined animations to apply to the graphical objects in a scene. In some embodiments, an animation includes instructions on how to modify the various parameters of the graphical objects, and may modify these parameters differently for the different objects. For instance, an animation might modify the position of the different objects based on the relation of the objects to a location in the scene, to each other, etc. In some cases, the animation calculates a first parameter for an object based on the value of a second parameter of the object (e.g., relating the size of objects to the speed of objects such that larger objects move more slowly).

As mentioned, the animation generator 110 of some embodiments includes a parameter reader 115 and an object animator 120. The parameter reader 115 reads object parameters from the graphical object information 125 stored by application 100. As stated, these parameters might include position (e.g., two- or three-dimensional position coordinates), rotation (e.g., x, y, and z rotation values), size (e.g., x and y values for flat objects or x, y, and z values for three-dimensional objects), anchor coordinates (e.g., x and y coordinates), and opacity (i.e., the inverse of transparency).

The object animator 120 retrieves the definition of an animation from the stored animation information 130 and applies the animation logic to the object parameters retrieved by the parameter reader 115. In some embodiments, the object animator 120 generates a set of keyframes for the graphical objects in the scene according to the animation logic. That is, the object animator 120 computes particular values for the different parameters of each object at specific times over the duration of the animation. While the keyframes for a particular parameter of two different objects might have the same time in the scene, in some cases the animation logic specifies that the parameter of the first object be modified differently than the parameter of the second object. For instance, the animation might specify that the object animator compute a center location of the scene and then modify the positions of the various graphic objects based on the position of the objects in relation to this center location. When needed, parameter values can be interpolated for times in between the keyframes.

The operation of the application 100 in order to automatically generate an animation will now be described. A user (e.g., an app developer) creates a scene including a set of graphical objects. These objects may have various parameters, and the information for the graphical objects (including the parameters) is stored in the graphical object information 125. Through the user interface 105, the application receives a selection of an animation 135 and sends this selection to the animation generator 110. A user might select the animation through a list of such animations displayed in a display area of the user interface, through a drop-down menu, etc.

The parameter reader 115 of the animation generator 110 identifies the parameters required to generate the selected animation, and retrieves these parameters 140 from the graphical object information 125. In some cases, the animation does not affect all of the objects in the scene, but instead only affects those which the user has selected. In addition, different animations affect different parameters of the selected object (e.g., movement animations might only affect the position parameters).

The parameter reader 115 passes the retrieved parameters to the object animator 120, which retrieves the definition 145 for the selected animation from the stored animation information 130. The object animator then applies the logic stored in the animation to calculate values for the parameters affected by the animation over the duration of the animation (which may be the entire scene or a portion of the scene). As mentioned, in some embodiments these values are generated by computing one or more keyframe values for the parameters, which set the parameter values at particular times. Values between keyframes are then interpolated in order to animate the object between the keyframes. In some embodiments, these object keyframes 150 (the keyframes generated by the developer) are stored in the graphical object information 125 as further information about the parameters of the animated objects (the interpolated values are not stored and are instead computed dynamically using the stored keyframes as the animation runs in some embodiments).

In some embodiments, when the application generating the animation is an app-building application, the developer associates the scene (which may include just the generated animation or additional object behaviors) with a particular action in the developed application that causes the display of the scene (i.e., a user of the developed application selecting a particular graphic object causes the display of the scene). For instance, a selection of one of the graphical objects might cause that graphical object and/or the other graphical objects to animate. As another example, the animation could be for an object in a game, such that when a user of the game enters a specific input, certain objects in the game (e.g., a character controlled by the user) perform specific animations.

In addition to animations within a scene, some embodiments automatically generate animations for transitions between scenes. A first scene might include a first set of graphical objects, while a second scene includes a second set of graphical objects (which may all be the same as the first set, may all be different, or may be partially the same and partially different). When a user (e.g., developer) indicates that the first scene should transition into the second scene, some embodiments automatically generate this transition as a set of parameter changes (e.g., keyframes).

FIG. 1 illustrates an example of an application that performs automatic animation generation. Several more detailed embodiments are described below. Section I describes the application of animation to graphical objects in a scene, while Section II describes the generation of an animated transition for graphical objects between scenes. Next, Section III describes a graphical user interface for an application-development application of some embodiments. Section IV then describes the software architecture of an application-development application of some embodiments. Finally, Section V describes an electronic system with which some embodiments of the invention are implemented.

I. Generation of Animations

As described above, some embodiments automatically generate animations to apply to graphical objects in a scene. As indicated, the animations may be generated by an application-development application, a titling application, a font-building application, etc. The following sections will describe the animation generation of some embodiments in the context of an application used to develop other applications, but one of ordinary skill in the art will recognize that the concepts set forth are equally applicable to other applications for different purposes.

Figure 2:
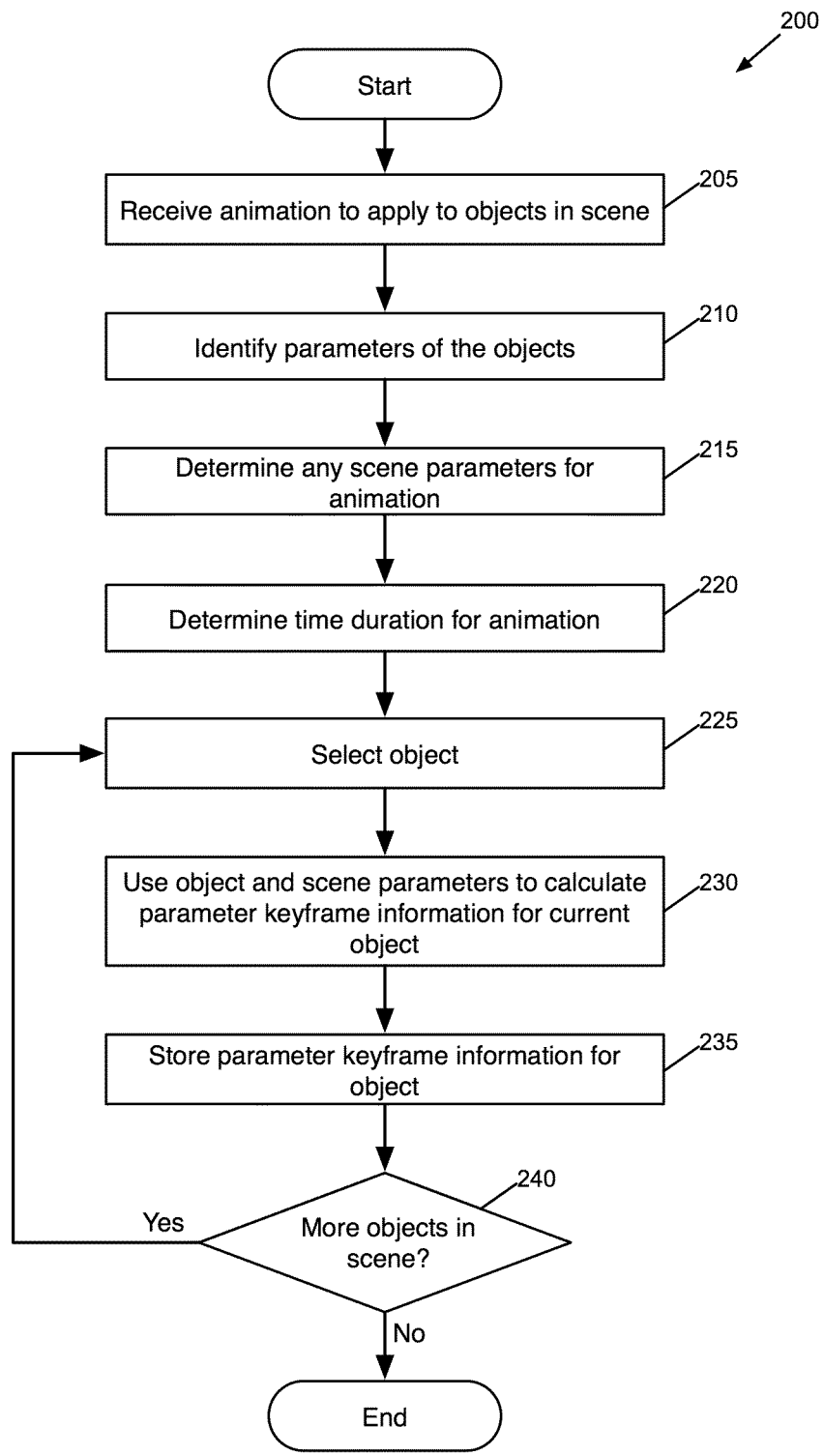
FIG. 2 conceptually illustrates a process of some embodiments for applying animation to one or more graphical objects.
Figure 3:
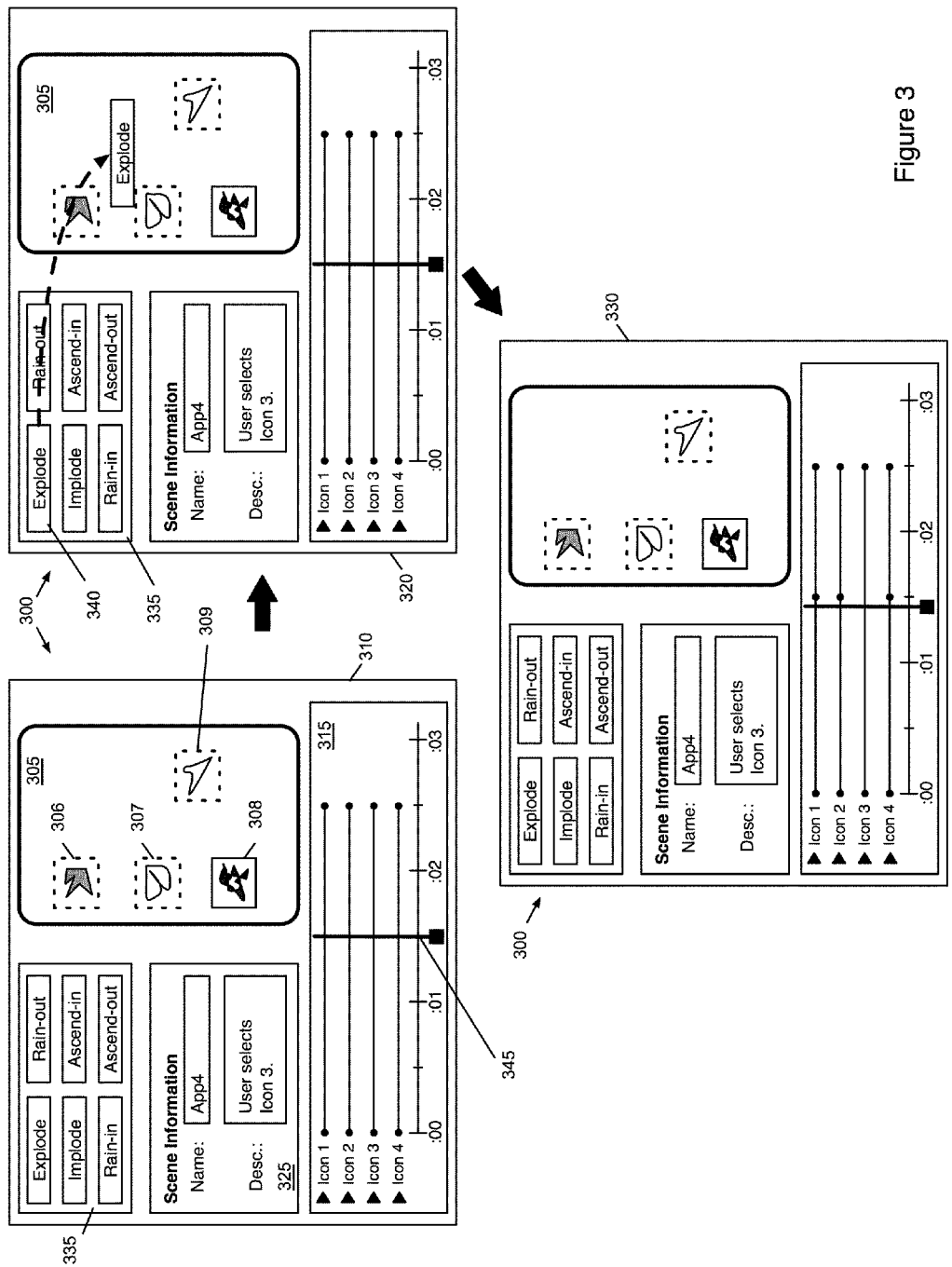
FIG. 3 illustrates the selection of an animation for a scene and the application of that animation to selected objects in a scene through a user interface of some embodiments.
Figure 4:
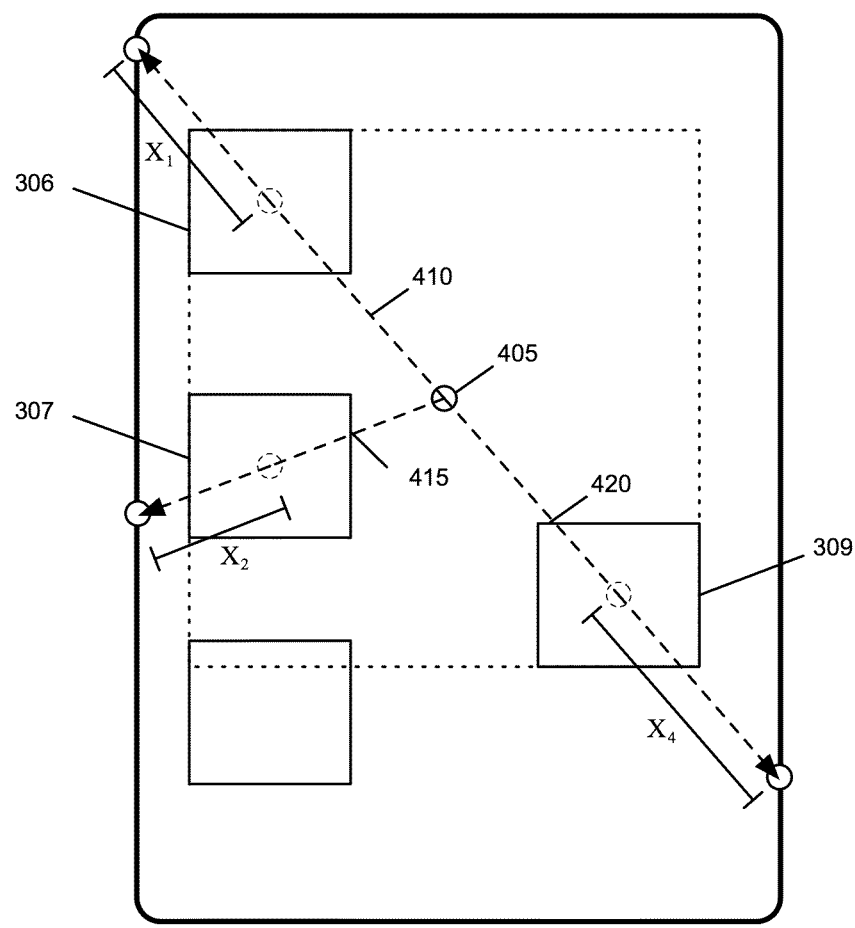
FIG. 4 conceptually illustrates the calculation of parameter changes for a selected animation.

FIG. 2 conceptually illustrates a process 200 of some embodiments for applying animation to one or more graphical objects. The process 200 will be described by reference to FIGS. 3 and 4. FIG. 3 illustrates a graphical user interface (GUI) 300 of an application-development application of some embodiments over three stages 310-330. Specifically, the figure illustrates the selection of an animation for a scene and the application of that animation to selected objects in a scene. FIG. 4 conceptually illustrates the calculation of parameter changes for the selected animation.

The first stage 310 illustrates the GUI 300 before the user selects an animation. The GUI 300 includes a scene display area 305, a scene timeline display area 315, an information display area 325, and an animations display area 335. The scene display area 305 displays an area showing the user interface of an application being developed using the app-developing application. This application might be a game (e.g., a smartphone or tablet game), an office application (e.g., a word processor, spreadsheet application, e-mail application, etc.), a media-editing application (e.g., audio-editing application, video-editing application, etc.), a web browser, etc. In some embodiments, the scene display area 305 shows the device for which the application is being designed. That is, when the application is an iPhone® game, the scene display area 305 has the shape and size of an iPhone display, and in some cases shows the exterior of the iPhone as well in order to provide a visual context. In some situations, the scene being developed is larger than the display area (e.g., if the application being developed is for a desktop), and the display area therefore only displays a portion of the scene at a given time.

The current scene includes four graphical objects 306-309. At the first stage 310, three of these objects are selected (the objects 306, 307, and 309). The fourth object 308 is currently unselected. These objects might be images (e.g., icons, etc.) in the application under development, or other items in the user interface of the developed application. The objects are selectable within the developed application in some embodiments, and may have an associated behavior (e.g., selecting one of the objects might cause the application to perform a function, display another object, etc.).

The scene timeline display area 315 displays a timeline for each of the graphical objects in the scene shown in scene display area 305. As shown in this figure, the icons 306-309 are named "Icon 1", "Icon 2", "Icon 3", and "Icon 4", as some embodiments allow users to assign names to the graphical objects (e.g., variables represented by the objects, effects performed upon selection of the objects, etc.). The timelines for the icons indicate times during the scene for which a keyframe is defined for an object. In some embodiments, these keyframes are indicated by circles or other indicators along the timeline. Any time during the scene at which a value for a parameter of an object is defined, the application defines a keyframe for the object. In the case of FIG. 3, the objects are all unchanged from the beginning of the scene to the end, so the keyframes are only defined at the start and end of the scene (which lasts 2.5 seconds). The scene timeline display area 315 also includes a playhead 345. The playhead indicates the time in the scene that is currently displayed in the scene display are 305, and can be moved along the timeline by the user. With the playhead 345 set at a particular time, the user can modify values for objects' parameters at that time, thereby setting a keyframe for the parameter at the particular time.

The information display area 325 displays information about a selected item. At the moment, the display area shows information about the currently selected scene shown in display areas 305 and 315. Different embodiments will include different information; in the figure, the display area includes a name for the scene and a user-editable description of the scene. Other information might include selectable options for the scene, such as the size, whether or not the scene should be paused at its start and end, a hotkey associated with the scene, etc. In some embodiments, the information display area may display information about other types of items, such as the individual graphical objects in a scene.

The animations display area 335 includes a set of selectable animations that a user of the development application can apply to objects in a scene. In various different embodiments, the animations may be selected from a set of displayed items as shown in the figure, a drop-down menu, a pop-up menu or dialog box, or any other type of user interface construct. The animations shown include explode (move objects away from a center point), implode (move objects inward towards a center point), rain-in (move objects from the top of the scene display down to their locations), rain-out (move objects from their locations downward to the bottom of the scene display), and ascend-out and ascend-in (the opposites of rain-in and rain-out, respectively). These animations are all positional animations (i.e., animations that modify the position of the graphical objects), but other animations are possible. Such animations can affect other parameters such as opacity (fade in or out), rotation (having the object spin), or a combination of parameters.

Returning to FIG. 2, the process 200 begins by receiving (at 205) an animation to apply to objects in a scene. In some embodiments, this is an animation that affects at least one parameter of one or more graphical objects in the scene, and affects the parameter(s) differently for different objects. That is, the change in values for a particular parameter of a first object will be different than the change in values for the same parameter of a second object. Rather than the animation logic including direct changes such as "add 50 to the y coordinate position value" that affect all of the objects in the same manner, the logic instead includes commands such as "identify center of scene; identify vector from center to object anchor; move object along vector to edge of scene display" (a simplified description of the "explode" animation).

The second stage 320 of FIG. 3 illustrates the selection of an animation for the scene displayed in scene display area 305. As shown, a user of the development application (i.e., the developer) selects a selectable item 340 (representing the "explode" animation) from the animations display area 335 and drops the item over the scene shown in the display area 305. A user might perform this drag-and-drop operation by controlling a cursor using a cursor controller, by actions through a touchscreen, etc. In fact, one of ordinary skill in the art will recognize that many of the operations shown in this document as performed with a cursor may also be performed using a touchscreen or other input device. In addition to the drag-and-drop operation shown in FIG. 3, in some embodiments the user selects an animation from a drop-down menu, by clicking (or performing a similar selection operation) on a selectable item without dragging the item, etc.

In this case, three objects in the scene are selected ("Icon 1" 306, "Icon 2" 307, and "Icon 4" 309. Some embodiments always apply a selected animation to all graphical objects in a scene. However, other embodiments apply the selected animation to only selected graphical objects. Thus, in this figure, the animation is only to be applied to graphical objects 306, 307, and 309. As shown in the information display area 325, the description of the scene is that a user selects "Icon 3" 308. Thus, when the user selects this object, the other three objects will be removed from the scene via the explode animation.

With the animation received, the process 200 identifies (at 210) parameters of the graphical objects to which the animation is applied. As stated, these parameters might be position coordinates, size information, rotation information, opacity, etc. In some embodiments, the animation only affects certain parameters, so the process identifies the object parameters needed for the animation. Some animations may only affect a subset of the parameters, but use other parameters of the object to calculate those changes (e.g., changing size or opacity based on an object's location in the scene). Some embodiments identify all of the parameters of the object, irrespective of whether the animation uses all of the parameters (e.g., with a function call that retrieves all parameters for an object).

The process then determines (at 215) any scene parameters used for the animation. In some embodiments, these scene parameters include parameters inherent to the scene (e.g., minimum/maximum x and y coordinates for the display, center coordinates for the display, etc.). The scene parameters may also include parameters calculated based on parameters from multiple objects. For instance, some embodiments animate objects based on a center point for the animated objects, rather than a center point of the scene.

FIG. 4 conceptually illustrates the calculation of a scene parameter for the explode animation selected in stage 320 of FIG. 3. In this case, the animation uses the center of the selected objects as its center point. Different animations may have different ways of calculating such a center location. In the illustrated case, the x-coordinate halfway between the minimum x-coordinate of one of the selected objects and the maximum x-coordinate of one of the selected objects is used, as well as the corresponding y-coordinate halfway between the minimum y-coordinate of one of the selected objects and the maximum y-coordinate of one of the selected objects. Some embodiments instead use the anchor points of the objects (often the centers of the objects, but this is a modifiable parameter in some embodiments) to determine the center (e.g., using a minimum and maximum in the same way as shown in FIG. 4, by taking the mean of all of the object center coordinates, etc.). Using objects 306, 307, and 309, the application calculates the location 405 as the center for the explode animation.

The process 200 also determines (at 220) the duration for the animation. In some embodiments, the animation either starts or ends at the time indicated by the playhead in the timeline display area. In some cases, this depends on whether the animation is an intro animation (i.e., an animation that opens a scene, such as by bringing graphical objects into a scene with a fade in or implode animation) or an outro animation (i.e., an animation that closes a scene, such as by exiting graphical objects from a scene with a fade out or explode animation). In some embodiments, intro animations start at the beginning of a scene and end at the playhead, while outro animations start at the playhead and end at the conclusion of the scene. When the parameter being modified by the animation already has a keyframe during this duration, some embodiments remove that keyframe from the timeline while other embodiments start (for intros) or end (for outros) at the keyframe.

In some embodiments, the timeline of the scene is broken into intro, middle, and outro sections. In some such embodiments, intro animations always affect the duration of the intro section and outro animations always affect the duration of the outro section. In addition to intro and outro animations, some embodiments include mid-scene animations that neither introduce nor remove graphical objects. For instance, objects might move in a circle, switch places with other objects, rotate, etc. In some embodiments, the user is prompted to select a duration for such animations. In other embodiments, the animations have a default duration (e.g., 0.5 seconds) that starts at the time indicated by the playhead.

With the scene parameters and duration determined, the process 200 begins calculating the animation of the objects. The process selects (at 225) an object. The order of selection might be based on various factors, including the location of the objects in the scene (e.g., top left to bottom right), the order in which the objects are stored in the development application memory, the order in which the objects were added to the scene, etc. In some cases, the application actually selects all of the objects at once and performs the operations 225-235 in parallel for all objects affected by the animation.

For the selected object, the process 200 calculates (at 230) parameter keyframe information using the object and scene parameters. That is, the process uses the animation instructions to calculate keyframes for one or more parameters of each of the objects being animated. Each keyframe indicates the value of one or more parameters at a particular time in the scene. For instance, if the animation moves the object along a single path, the process defines keyframes at the start and end of the duration of the animation. These keyframes would define the positions of the object at these times and any other information needed to define the movement between these keyframes (e.g., tangent information at the start and end if moving along a bezier curve). For more complicated animations, the process might need to define additional keyframes beyond just the start and end of the duration (e.g., in the middle of the animation to indicate a change of direction).

The development application automatically calculates the values for the keyframes using the animation logic. As stated above, the value for a particular keyframe might use the parameter for which the keyframe value is being calculated, other parameters of the object, parameters of other objects, scene parameters, etc. FIG. 4 conceptually illustrates the calculation of these parameters for the explode animation applied in FIG. 3. This figure shows three vectors 410, 415, and 420 from the center point 405 through the graphical objects 306, 307, and 309, respectively. Each vector passes through the anchor point (in this case, the center) of its object to the edge of the scene. For the current animation, the only keyframe parameters needed are the coordinates of the point where these vectors hit the edge of the scene display. For a specific object, the process calculates these coordinates and stores the coordinates as the position of the object at the end of the scene.

If, however, the animation called for the objects to each move at the same speed (and could thus leave the scene at different times), the process would have to first calculate the coordinates for an object, then calculate the time at which the object needed to arrive at those coordinates based on the distance (e.g., the distances $X_1$, $X_2$, and $X_4$ shown in FIG. 4). A yet more complicated calculation would involve having all of the objects move at the same speed, but indicating that the object moving the longest distance to the edge should arrive at that point at the end of the scene. Thus, the speed would need to first be calculated as the distance $v=X_4/t$ (where t is the time from the playhead to the end of the scene), then the time for each of the other two objects to reach the edge could be calculated as $X_1/v$ and $X_2/v$. In these situations, the objects would all have keyframes at different times in the scene and would have object timelines that do not extend beyond their particular keyframes.

The above paragraphs indicate calculations to determine parameter values for a particular animation. This modification to the parameter values for a first object is different than the modification to the parameter values for a second object, based in this case on the parameter values of the two objects. In some embodiments, many different animations are available for a scene, and each animation calls for a different set of calculations for different parameters. These calculations might use the parameters themselves, scene parameters (such as the center point shown in FIG. 4), other parameters, etc. Additional animations will be described below.

After calculating the parameter keyframe values, the process 200 stores (at 235) the parameter keyframe information for the current object. These keyframes are stored in data defining the scene, in some embodiments. This scene data may be associated with a particular action or behavior within the application being developed using the development application. Thus, when a user of the developed application later performs this action, the animated scene is displayed on that user's device. When the objects animated in the scene are those already displayed on the device, then the "scene" does not appear as a new scene with new objects, but rather as an animation of the graphical objects already displayed.

The process next determines (at 240) whether additional graphical objects remain for which the process needs to generate animation keyframes. When additional objects remain, the process returns to 225 to select the next object. Once the process 200 has evaluated all of the objects, the process ends.

The third stage 330 of FIG. 3 illustrates the user interface 300 after the application of the animation selected at stage 320. For illustrative purposes, the playhead 345 is shown at a time shortly before the animation begins (i.e., at a time earlier than in the previous stages). At the 1.5 second mark, the timelines for objects 306, 307, and 309 indicate keyframes. These keyframes actually store the same values as the keyframes at the beginning of the scene, because the objects do not move during these initial 1.5 seconds. The keyframes at the end of the scene store the location coordinates calculated as described above by relation to FIG. 4, and the application interpolates values in between the keyframes when displaying the scene in the display area 305. When creating the developed application, the developing application stores the keyframes and interpolation (e.g., move in straight line at constant rate) in some embodiments. Other embodiments, however, calculate the interpolation and store in the developed application a large set of values for the object along its movement from one keyframe to the next.

Figure 5:
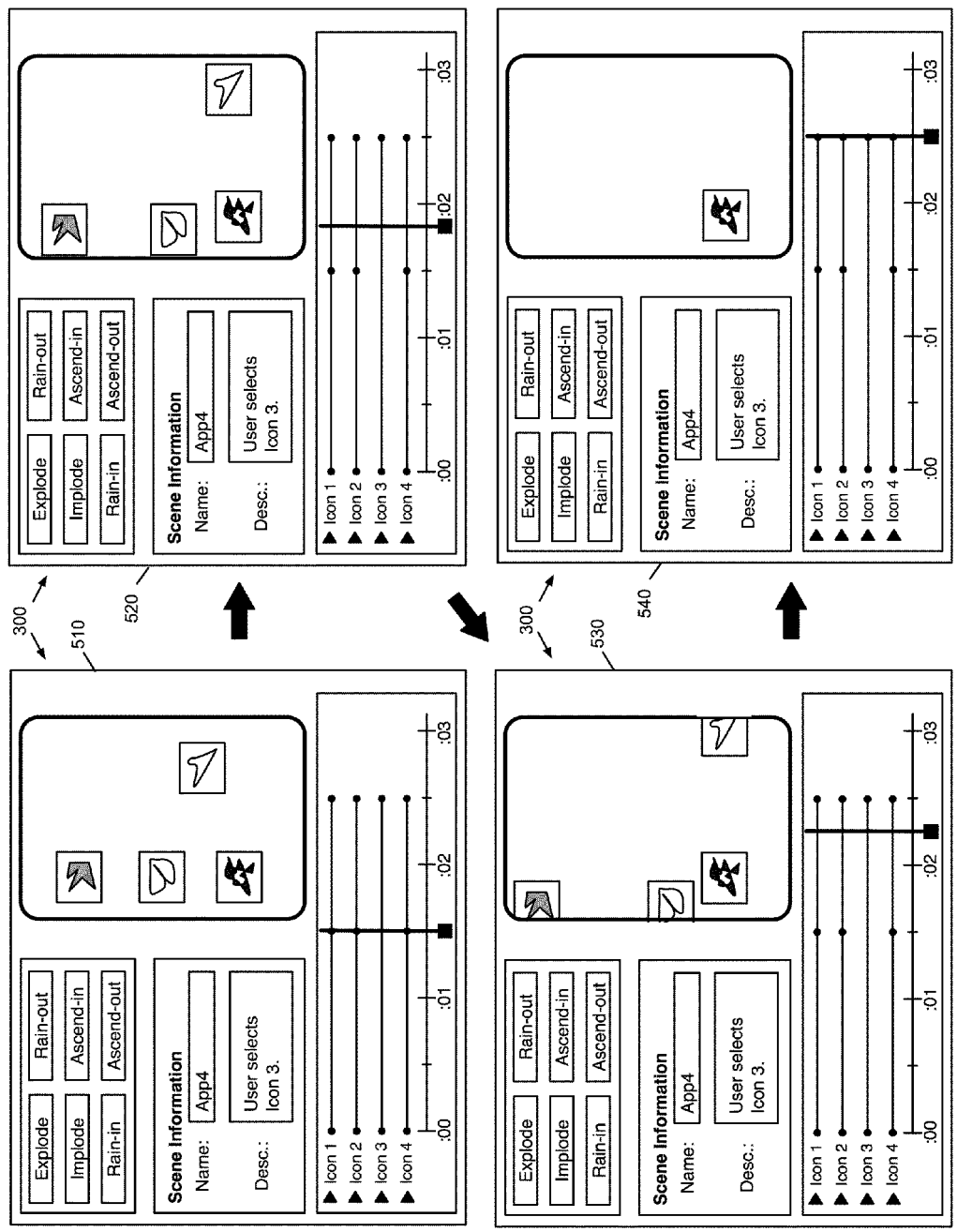
FIG. 5 illustrates the user interface in four stages as the scene moves through the animation generated in FIG. 3.

FIG. 5 illustrates the user interface 300 in four stages 510-540 as the scene moves through the animation generated in FIG. 3. As shown at stage 510, the playhead 345 is currently located at the 1.5 second mark, from which the animation starts. At this point, none of the graphical objects 306-309 are selected, and they appear in the same locations in scene display area 305 as in FIG. 3.

The second stage 520 illustrates the scene with the playhead at approximately 1.8 seconds. The playhead might have been moved via a user selecting and moving the playhead (e.g., with a cursor controller, a movement along a touchscreen, etc.), the user selecting a play option (e.g., through a hotkey, a drop-down menu, a selectable item in the timeline display area, etc.), or another action. At this stage, the graphical objects 306, 307, and 309 have moved outward along the vectors shown in FIG. 4. Because the playhead is approximately one third of the way along the animation duration, the graphical objects have moved approximately one-third of the way along their respective vectors. The graphical object 308, on the other hand, has not moved.

At the third stage 530, the playhead 345 is approximately at the 2.25 second mark, and the graphical objects 306, 307, and 309 have moved along their vectors (between the keyframe positions at 1.5 seconds and at 2.5 seconds) such that they are each partially out of the scene display. Finally, in stage 540, with the playhead at 2.5 seconds, the graphical objects 306, 307, and 309 are no longer displayed in the scene display area 305. While the animation moved the centers of these objects to the edge of the display area, some embodiments actually remove the objects at this time according to the animation definition. Other animations instead use a keyframe position that moves the object completely out of the display (i.e., moves the anchor of the object far enough outside the display that the object is not at all displayed).

Figure 6:
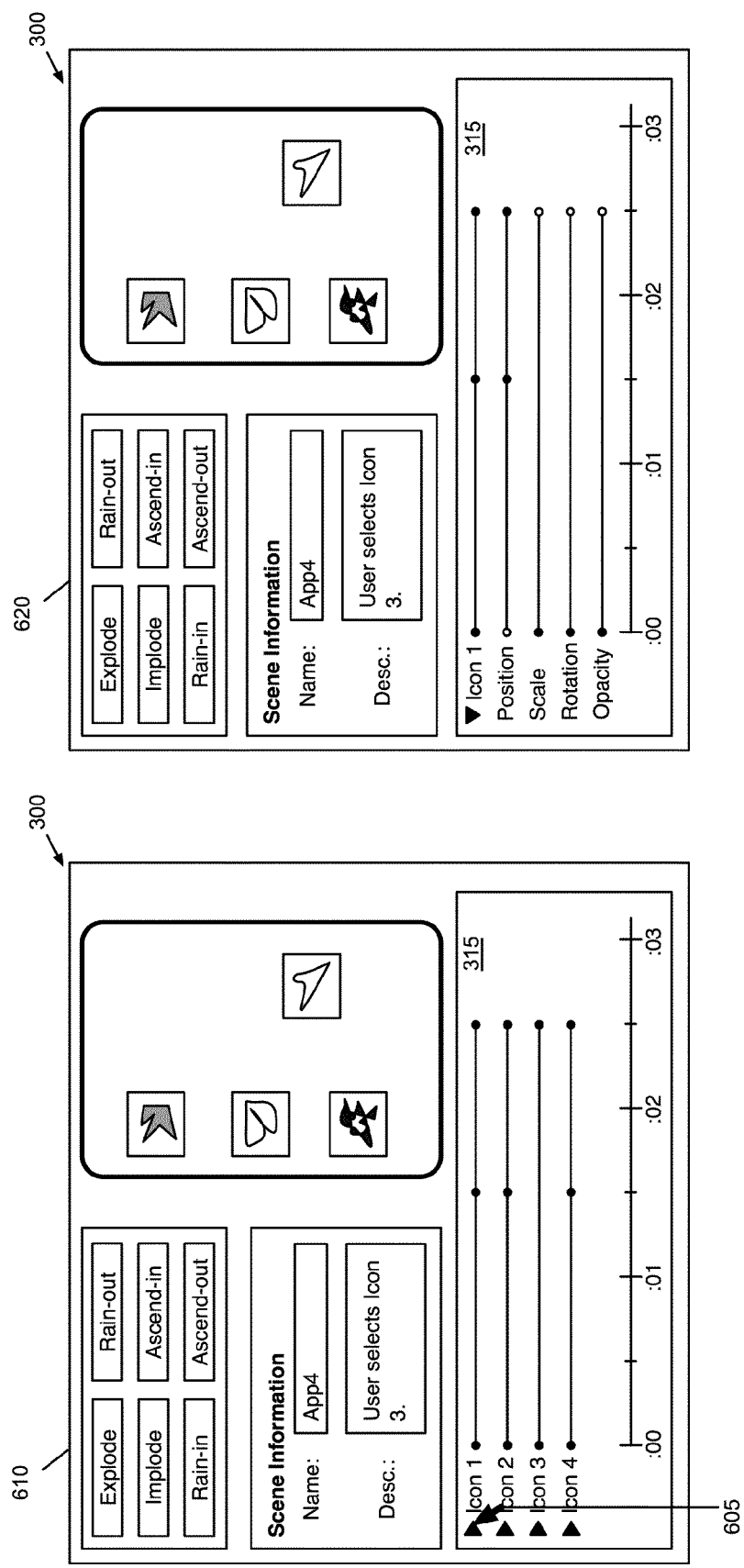
FIG. 6 illustrates the GUI in two stages in which a user drills down into one of the object timelines in order to view the timelines for its different parameters.

The object timelines displayed in the timeline display area 345 in the above figures indicate the times at which keyframes are set for each object, but does not indicate which parameters of an object change at those times. FIG. 6 illustrates the GUI 300 in two stages 610 and 620 in which a user drills down into one of the object timelines in order to view timelines for its different parameters.

In the first stage 610, the GUI 300 displays the same thing as at the stage 510 of FIG. 5. So as to not obstruct the timelines, the playhead is not shown in these figures. In the first stage, the user has placed a cursor 605 over an expander item for the first object timeline. As indicated above, while some of the figures in this application illustrate a cursor, one of ordinary skill will recognize that some embodiments may use different cursor controllers or may operate via touch control without displaying a cursor at all.

The second stage 620 illustrates the timeline display area 315 after the user has expanded the object timeline for the first object 306. The display area now displays a first timeline for the object as well as timelines for each of position, scale, rotation, and opacity. Some embodiments include more, fewer, or different parameters than those shown in this figure. In this case, only the position parameters have been modified by the animation applied in FIG. 3, so only the position timeline indicates a keyframe at 1.5 seconds.

Some embodiments use a different indicator at the start or end of a parameter timeline to indicate that the parameter does not change between that indicator and the adjacent keyframe. For instance, the scale, rotation, and opacity parameters of graphical object 306 do not change over the 2.5 seconds of the scene, so these have empty circle indicators at the end of timeline. The position parameters do not change until the 1.5 second mark, so the position timeline has an empty circle indicator at the start of the scene (indicating that between 0 and 1.5 seconds the position of the object does not change). If a mid-scene animation were to modify a parameter from 1 to 2 seconds, then the parameter timeline might have these non-change indicators at the start and end of the timeline, with two keyframes in the middle of the timeline.

While FIG. 6 shows separate timelines for the position, scale, rotation, and opacity parameters, some embodiments allow a user to further drill down and see each position parameter (e.g., separate timelines for x, y, and z coordinates), each scale parameter (e.g., separate timelines for x, y, and z sizes), and each rotation parameter (e.g., x, y and z rotation values).

Opacity, in some embodiments, is a single value and thus cannot be drilled down further. In addition, some embodiments let a user see a two-dimensional graph of each individual parameter that shows the values of the parameter. For instance, in this case, an x-coordinate parameter graph would display a straight line from the start to 1.5 seconds at a value of x=30 (the x coordinate value as the icon is currently shown in scene display area 305), then show this dropping in a straight line down to a value of 0 at the 2.5 second mark. In some embodiments, such graphs allow a user to vary the interpolation between two keyframes (e.g., as a bezier spline rather than a straight line).

The above example shows a simple animation that affects only one parameter of each affected graphical object (the position, though this could actually be viewed as both x and y coordinate parameters). Some embodiments include animations that affect multiple parameters of an object in different ways, in addition to affecting the same parameter differently for different objects.

Figure 7:
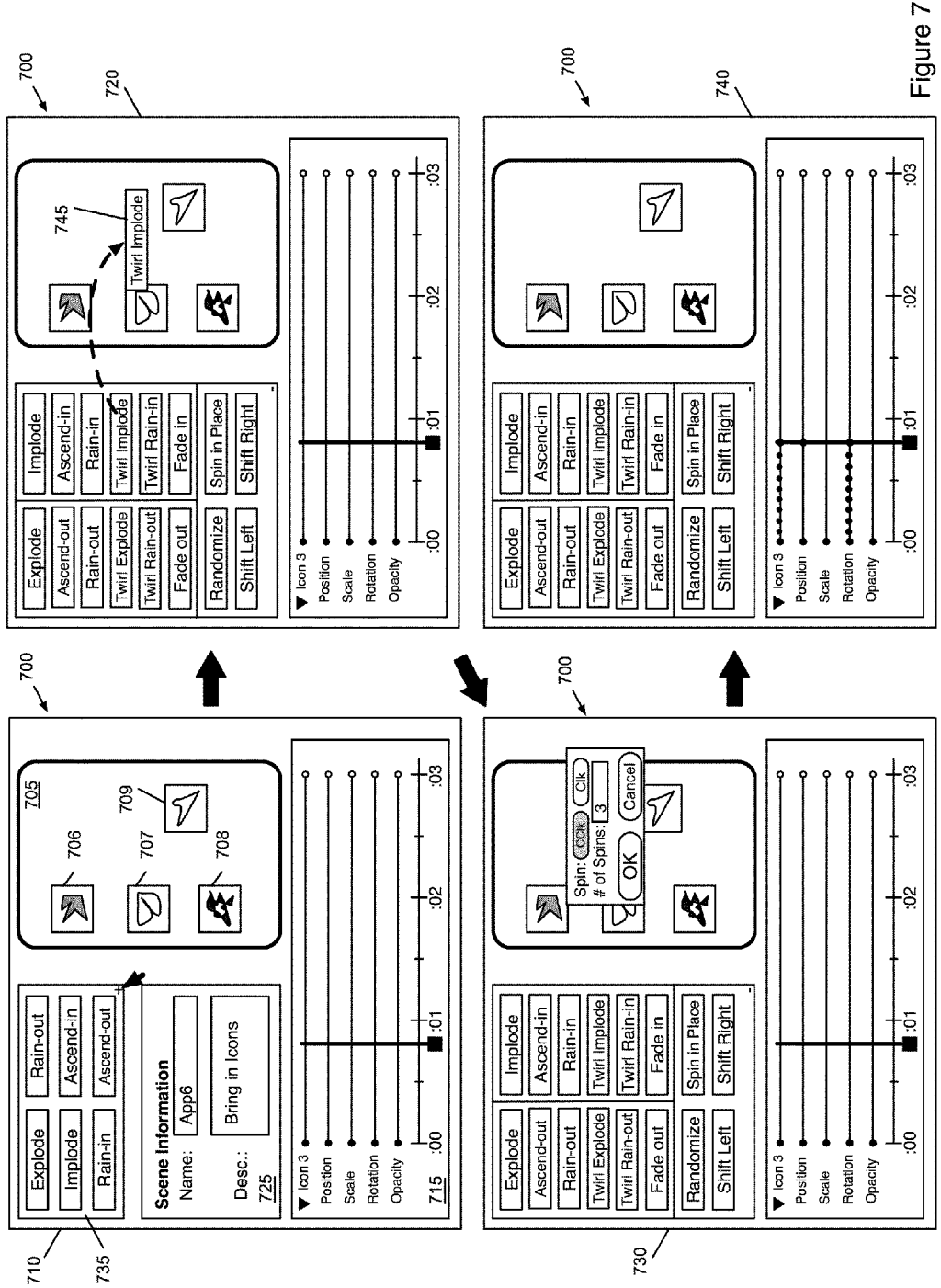
FIG. 7 illustrates a GUI over four stages in which a user applies an animation that affects multiple parameters to a set of graphical objects.

FIG. 7 illustrates a GUI 700 over four stages 710-740 in which a user applies an animation that affects multiple parameters to a set of graphical objects. The GUI 700 includes a scene display area 705, a timeline display area 715, an information display area 725, and an animations display area 735. These display areas are similar to those described above for the GUI 300 of FIG. 3. In this GUI, none of the graphical objects 706-709 are currently selected. In addition, the timeline display area 715 only shows the timelines for the third object 708. The bottom right corner of the animations display area 735 includes a small "+" expander item over which a user (e.g., application developer) has placed a cursor in order to expand the display area.

The second stage 720 illustrates that the user has expanded the animations display area 735 so that more animations are available for selection. As a result, the information display area 725 is no longer displayed. The additional animations include twirl implode and twirl explode animations (similar to the implode and explode animations, but with the object spinning as it moves), twirl rain-in and twirl rain-out animations (again similar to the rain-in and rain-out animations), fade in and fade out animations (that brings object opacity from 0 to 1 and 1 to 0, respectively, over the duration of the animation), a randomize animation (that randomly rearranges the graphical objects), a spin in place animation (that spins the objects without changing their positions), and shift left and shift right animations (that reposition the graphical objects so that each object moves to the location of the object to its left or right, respectively). These animations are arranged with the outro animations on the left, the intro animations on the right, and the mid-scene animations on the bottom.

These additional animations include animations that only affect one parameter (fade in and out) as well as animations that affect multiple parameters (e.g., twirl implode). One of ordinary skill will recognize that these are by no means a comprehensive list of all possible animations, and that many different types of animations are possible. For instance, an animation might combine the implode with a fade in, or a mid-scene animation might fade out and then fade back in, etc.

The second stage 720 also illustrates the selection of an animation for the scene displayed in scene display area 705. As shown, the user (i.e., developer) selects a selectable item 745 (representing the "twirl implode" animation) from the animations display area 735 and drops the item over the scene shown in the display area 705. As with the similar operation shown in FIG. 3, a user might perform this operation through a touchscreen, cursor controller, etc., and the animation might be selected differently in different embodiments (e.g., from a drop-down menu, clicking or tapping a selectable item, a hotkey, etc.).

In this case, none of the objects 706-709 are selected when the user drops the animation item 745 onto the scene. In some embodiments, this applies the animation to all objects in the scene. As such, a process such as the process 200 described above will apply the twirl implode animation to each of the objects 706-709.

As shown in stage 730, however, some embodiments include user options for some animations. In this case, the spinning aspect of the selected animation allows a user to choose between counterclockwise or clockwise rotation as well as the number of spins, or rotations. In this case, the user has selected three counterclockwise rotations. While this figure shows some aspects of the animation as user-selectable, some embodiments perform the automatic animation with no user input other than the selection of the animation. For instance, some embodiments include a default rotation direction and number of rotations, while other embodiments have both clockwise and counterclockwise animations with fast, medium, and slow rotation speeds that determine the number of rotations based on the duration of the animation.

The fourth stage 740 of FIG. 7 illustrates the keyframes calculated for the animation for the third object "Icon 3" 308. Because the selected animation is an intro animation, the animation runs from the beginning of the scene to the playhead (at approximately 0.8 seconds) As shown, the position parameter has a keyframe indicator at the start of the animation and another keyframe at the end of the animation duration. Because the graphical objects move in a straight line, only these two object keyframes are needed for the position (similar to the explode animation shown above).

However, for the rotation parameter, numerous keyframes are generated to define the rotation. Some embodiments use rotation keyframes that define the rotation of an object at a particular time (e.g., rotated 90 degrees about the z axis at 0.3 seconds), and then interpolate a constant rotation between keyframes in whichever direction is shortest. For example, if a first keyframe is at 0 degrees and a second keyframe is at 90 degrees, the rotation would be counterclockwise from 0 through 90. On the other hand, if the second keyframe is at 270 degrees, the rotation would be a 90 degree clockwise rotation. Thus, the twirl implode animation shown in FIG. 7 generates keyframes for each 120 degrees of the rotation, or a total of nine new keyframes for the three spins. Some embodiments include a direction of rotation as part of the keyframe definition, and would generate fewer keyframes (e.g., one keyframe for each spin, keyframes every 180 degrees, etc.).

In this case, the rotation keyframes can be calculated separately from the position keyframes. To calculate the position keyframes, the application performs calculations similar to those shown in FIG. 4, only with the translation vectors going from the outside towards the center. In addition, if calculating the scene center based on the object locations, then the center calculation is different because all four graphical objects are included. The first position keyframe (at 0 seconds) is the location of the object at the outer edge of the scene, while the second position keyframe (at 0.8 seconds) is the location of the object as shown in this figure. The rotation keyframes are simply a calculation of taking the total duration (0.8 seconds) and dividing by the nine needed keyframes so that the keyframes are generated every 0.089 seconds. The keyframes are for rotations about the z axis (the axis perpendicular to the two-dimensional scene) and the values are 0, 120, 240, 0, 120, 240, 0, 120, 240, and 0. This defines three counterclockwise rotations over the course of the 0.8 seconds. As shown, none of the parameters change after this animation, so the end of the scene (3 seconds) is marked with the no change indicators.

In addition to generating keyframes with automatic animations, the development application (or other application for generating applications) of some embodiments allows users to manually generate animation through keyframes. In some embodiments, users may generate keyframes by moving or rotating objects in the scene display area or by entering parameter values.

Figure 8:
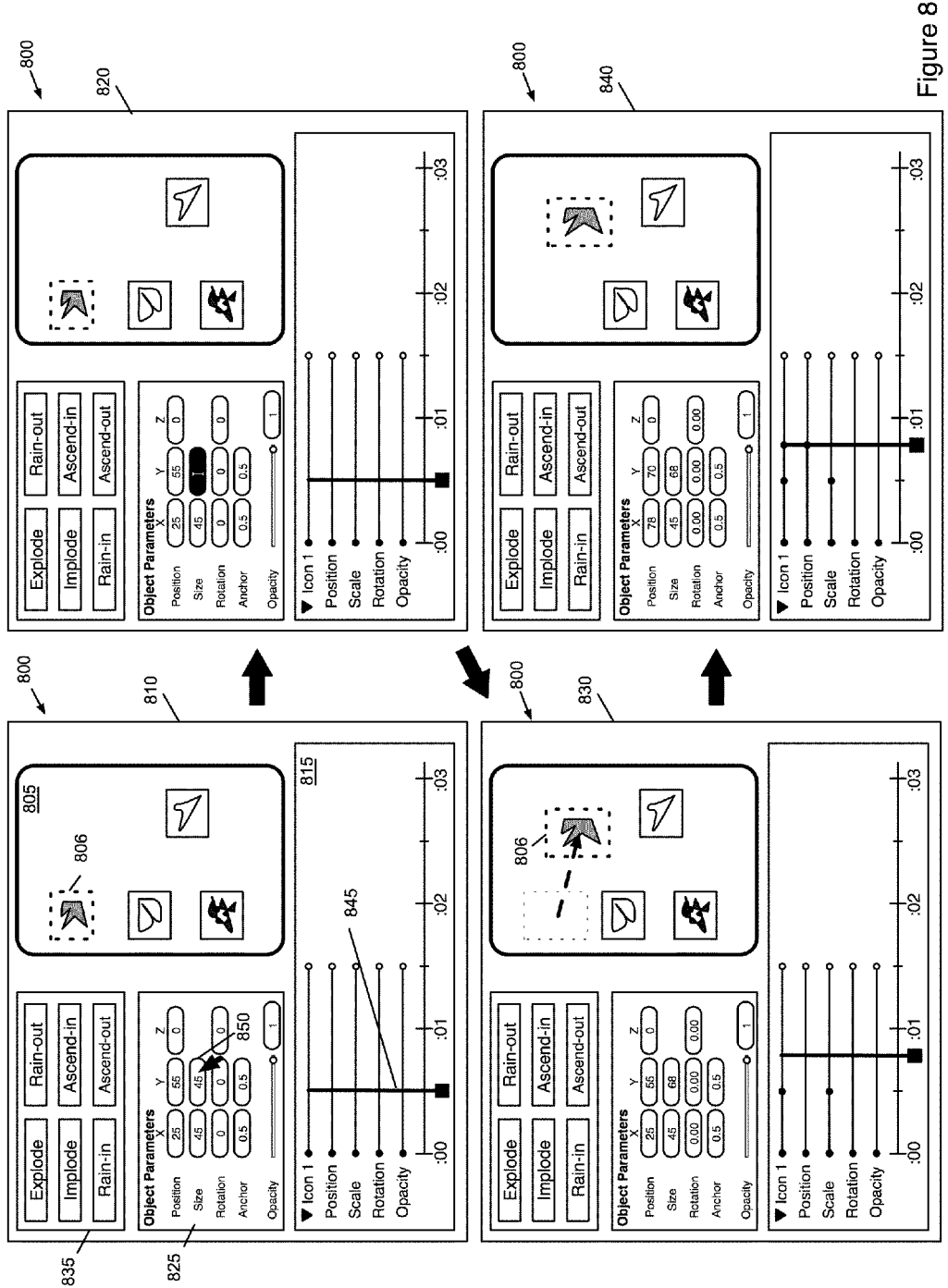
FIG. 8 illustrates a GUI over four stages in which a user directly manipulates object parameters.

FIG. 8 illustrates a GUI 800 over four stages 810-840 in which a user directly manipulates object parameters. The GUI 800 includes a scene display area 805, a timeline display area 815, an information display area 825, and an animations display area 835. These display areas are similar to those described above for the GUI 300 of FIG. 3. In this GUI, the graphical object 806 is currently selected, and the timeline display area 815 currently shows the various parameter timelines for this object.

Furthermore, the information display area 825 currently shows information about the selected object rather than the current scene. In some embodiments, the information display area (sometimes called an inspector) displays information about a selected item, whether that item is a scene, a graphical object in the scene, etc. Other embodiments include both scene information (as shown in FIG. 3) and object information in different display areas.

The object information in display area 825 includes values for the different parameters of the selected object. In some embodiments, these values indicate the value of the parameters at the time in the scene indicated by the playhead 845. The position parameters include x, y, and z positions, which are given in pixels in some embodiments, but may also use other units of measurement (e.g., inches, centimeters, etc.) or a percentage of the scene display or target device display. Similarly, the x and y size parameters are given in pixels. In embodiments that use three-dimensional objects, a z size parameter may additionally be used. The x, y, and z rotation parameters use degrees in some embodiments, but may also use radians. The anchor parameter (a point within the object that is used as the center for rotations, translations, etc.), is given as a percentage of the size in some embodiments. Finally, the opacity parameter includes a slider and a value that runs from 0 (fully transparent) to 1 (fully opaque). One of ordinary skill in the art will recognize that different parameters may be used and different units may be used for the parameters shown. In addition, some embodiments allow users to select between different units of measurement (e.g., between degrees and radians).

The first stage 810 illustrates that a user has placed a cursor over the y axis size parameter value item 850. In some embodiments, the parameter values are shown as items that can be edited manually (e.g., by typing in numbers on a keyboard or touchscreen keyboard). Furthermore, in some embodiments the different items include up and down arrows (not shown in this figure) that allow a user to increment or decrement the values.

At the second stage 820, the user has selected and started typing in a new value for the y axis size parameter. Thus, the parameter item 850 is now black to indicate the selection, and a text cursor is shown within the item as the user begins to type in a new value for the vertical size of the selected graphical object 806.

The third stage 830 illustrates the result of the user entering a new value for the y axis size parameter (from 45 to 68) for the object 806. As a result, the object 806 is stretched along the y axis, occupying 68 rows of pixels rather than 45. In addition, the scale parameter timeline for this graphical object now has a keyframe at the 0.5 second mark, indicating that the object grows in size over the first 0.5 seconds of the scene.

Furthermore, the user has moved the playhead to around the 0.8 second mark and is moving object 806 within the scene display area 805. Some embodiments allow the user to modify at least some of the parameters within the scene display area. The user can modify the position of an object by selecting the object and performing a drag and drop operation in some embodiments (e.g., with a cursor controller, through a touchscreen, etc.). In some embodiments, sizing handles also appear on a selected object with which a user can resize the object. Furthermore, some embodiments allow a user to move the anchor or rotate the object using on-screen controls in the scene display.

As a result of the user dragging the object 306, the fourth stage 840 illustrates that keyframes are now shown at the 0.8 second mark (the location of the playhead) for the object timeline and the position parameter timeline. In addition, the x and y position values shown in the information display area 825 have been modified (the x coordinate from 25 to 78 and the y coordinate from 55 to 70). The result of these modifications is a scene in which the object 806 moves down and to the right over 0.8 seconds, while expanding for a portion of this time. This movement is a straight line in this case, though some embodiments display on-screen controls for the path and allow the user to modify the path (e.g., as a bezier curve).

II. Automatic Transitions Between Scenes

The above section describes animations within scenes, in which the user selects a particular animation for a scene or a portion of the scene and the application (e.g., app-building application, titling application, etc.) automatically generates the animation for one or more objects. Some embodiments also enable a user to create multiple different scenes and then create an animated transition between scenes. In some embodiments, the application automatically generates the animation based on the parameters of objects at the end of the first scene and start of the second scene as well as whether these objects are the same or different. As with the animations discussed above, the animated transitions affect different objects differently. Such transitions may be useful (rather than creating a single long scene encompassing both scenes and transition) when an application the user is developing will use both scenes individually, but will also often want one of the scenes to transition to the other for various occurrences in the application (e.g., particular inputs).

Figure 9:
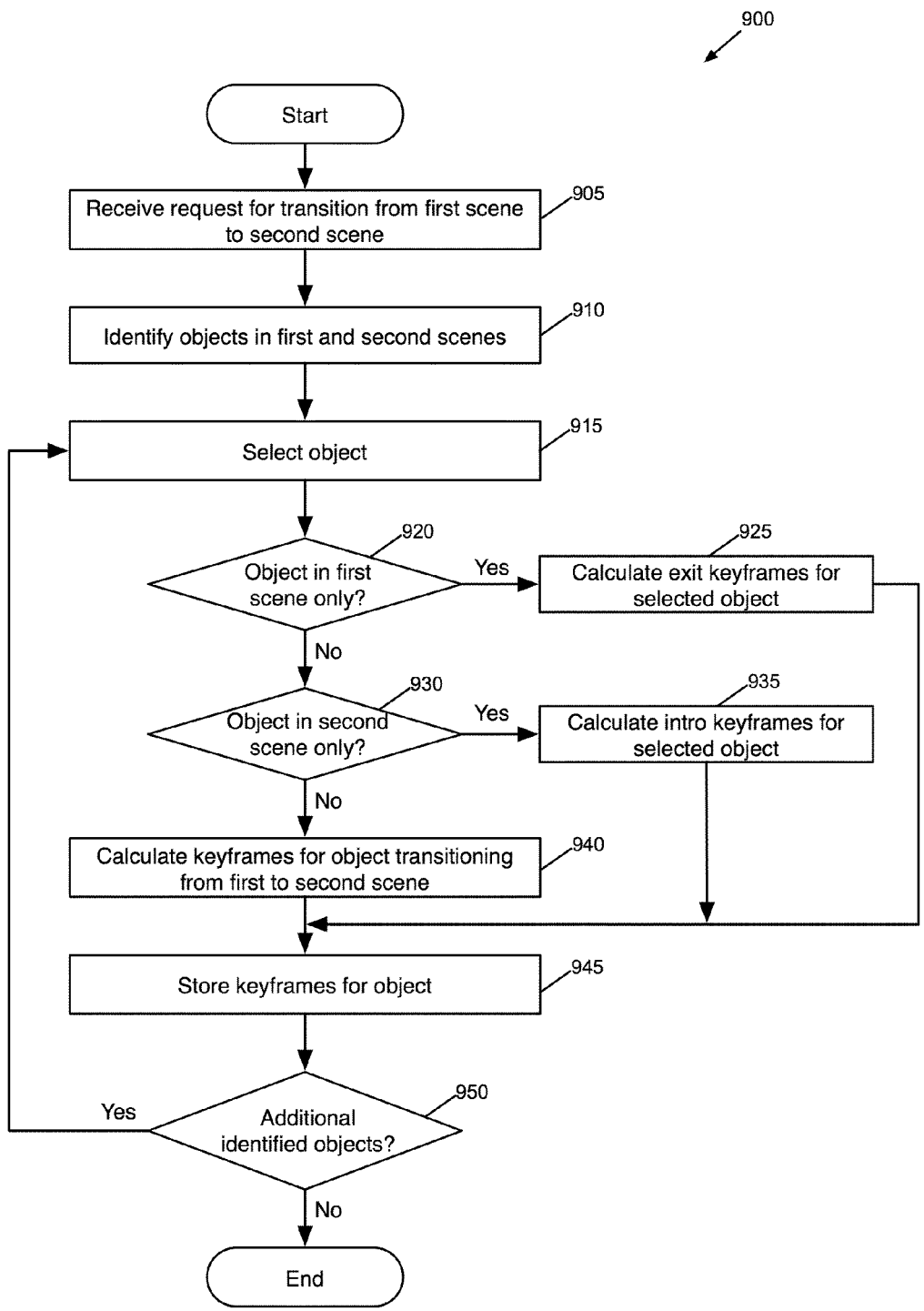
FIG. 9 conceptually illustrates a process of some embodiments for applying an animated transition between two scenes to the graphical objects of those scenes.

FIG. 9 conceptually illustrates a process 900 of some embodiments for applying an animated transition between two scenes to the graphical objects of those scenes. The process 900 will be described by reference to FIGS. 10 and 11, which illustrate the application of a transition between two scenes in a GUI 1000 of an application-development application of some embodiments.

Figure 10:
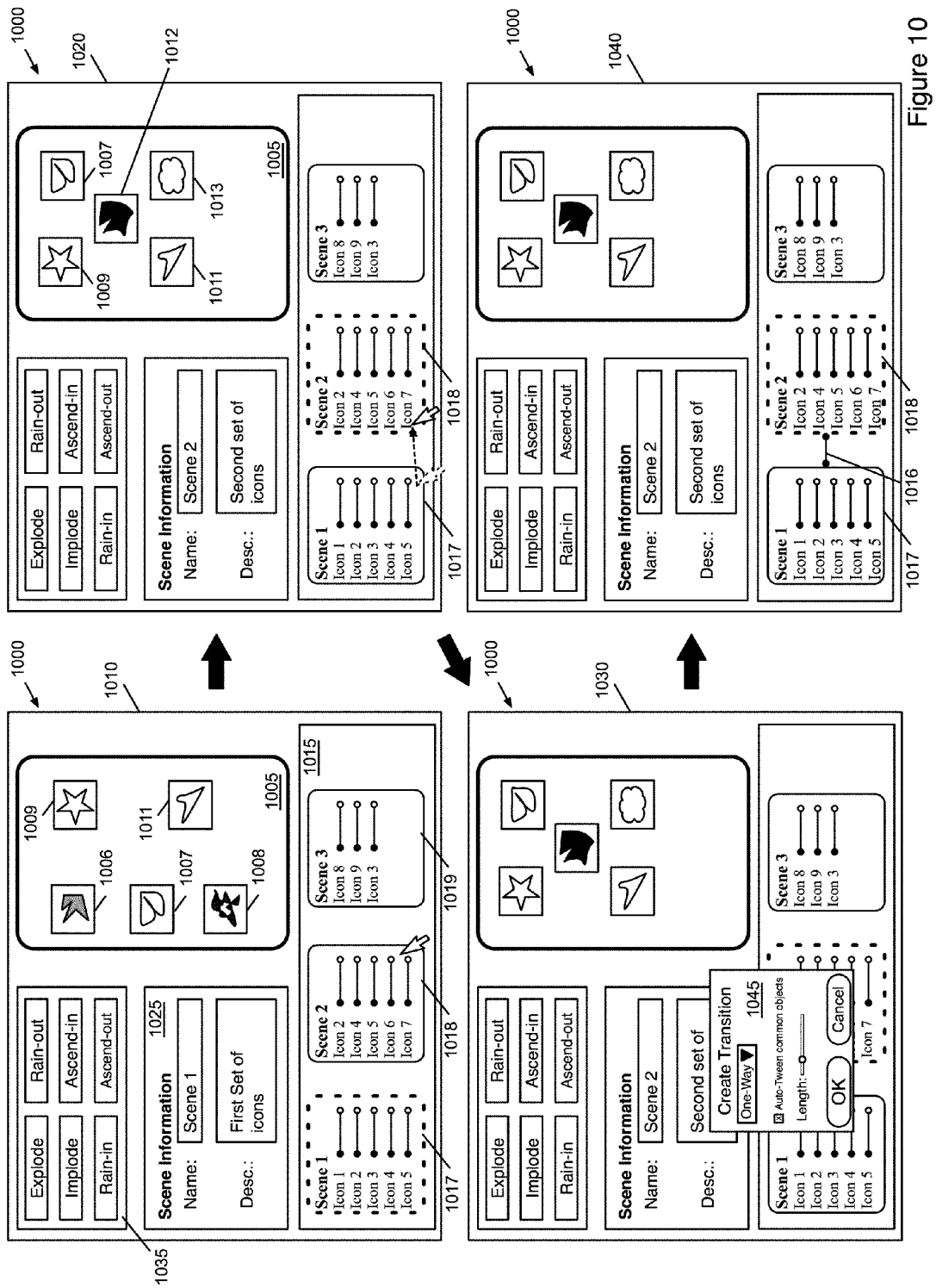
FIG. 10 illustrates a user applying a transition to two scenes in a GUI over three stages.

FIG. 10 illustrates a user applying the transition to two scenes in the GUI 1000 over four stages 1010-1040. The GUI 1000 includes a scene display area 1005, a timeline display area 1015, an information display area 1025, and an animations display area 1035. These display areas are similar to those described above for the GUI 300 of FIG. 3. However, in this GUI, the timeline display area 1015 displays a set of scene items 1017-1019 rather than a set of object or parameter timelines.

The scene items 1017-1019 each represent one scene created with the development application through the GUI 1000 for the application being developed. These scenes may have different graphical objects or all have the same graphical objects. In this case, as shown, the second scene "Scene 2" includes some of the same objects as the first scene "Scene 1", but additionally a number of different objects. Each of these two scenes include five objects, while the third scene "Scene 3" includes only three objects. In some embodiments, the scene items are arranged in the timeline display area such that the display area functions as a "global timeline" that may be used to view animations both within scenes and between scenes.

In the first stage 1010, the first scene item 1017 is selected. Accordingly, the scene display area displays the first scene, and the information display area 1025 displays information about this scene. The scene item 1017 includes the name of the objects in the scene as well as small object timelines for each object. These timelines indicate that the objects do not change during the duration of the scene. In some embodiments, certain selection operations (e.g., double-click, double-tap, etc.) on a selectable scene item cause the timeline display area to display object timelines for the selected scene rather than the scene items.

In some embodiments, selectable scene items are displayed in a separate display area from the timeline, and display a small view of the scene rather than object timelines. Selecting a scene item in such embodiments causes the timeline display area to display the object timelines for the scene and the scene display area to display the selected scene.

Returning to FIG. 9, the process 900 begins by receiving (at 905) a request for a transition from a first scene to a second scene. Different embodiments of the application receive such a request in different ways. For instance, in some embodiments the user selects two scenes, then selects a transition option from a drop-down menu. In other embodiments, the user drags between two scenes (e.g., a right-click drag, a two-finger drag on a touchscreen, etc.) to create a transition between the two scenes. Some embodiments open a dialog box upon receiving this selection in order for the user to provide additional information about the transition.

The second stage 1020 illustrates a user dragging a cursor from the first scene item 1017 to the second scene item 1018 in order to automatically create a transition between these two scenes. This stage also illustrates that the user has previously selected the second scene item 1018, and therefore this scene is displayed in the scene display area 1005 (and its information displayed in the information display area 1025). The scene includes three of the same graphical objects as the first scene (graphical objects 1007, 1009, and 1011), though these objects are all in different positions. In addition, two of the graphical objects 1012 and 1013 are new to this scene (i.e., not in the first scene).

As a result of the user performing the drag operation from the first scene to the second scene, the application displays a new display area (i.e., dialog box) 1045 for creating the transition between these two scenes. The dialog box 1045 includes a drop-down menu to allow a user to select whether the transition will be a one-way or bidirectional transition (i.e., whether the transition is used only when the developed application goes from the first scene to the second scene or whether the transition also plays backwards when the developed application goes from the second scene to the first scene). The dialog box 1045 also includes a checkbox that says "Auto-Tween common objects", indicating that objects common to the scenes should be automatically transitioned. Finally, the dialog box 1045 includes a length slider that allows the user to set the length of the scene.

Different embodiments will include different options for a transition. For instance, some transitions may have a fixed length, always automatically transition common objects, or only work one-way (i.e., requiring the user to create a second transition for the other direction). Furthermore, some embodiments may include an option to automatically transition objects in and out, or may include options as to how to transition the non-common objects (e.g., fade, explode/implode, rain/ascend, etc.).

Returning again to FIG. 9, after receiving the transition request, the process 900 identifies (at 910) the graphical objects in the first and second scenes (i.e., the scene at which the transition begins and the scene at which the transition ends). In the example illustrated in FIG. 10, the objects in the first scene are five icons 1006-1009 and 1011, while the objects in the second scene are five icons 1007, 1009, and 1011-1013.

The process then selects (at 915) one of the identified graphical objects. The order of selection might be based on various factors, including the location of the objects in their scene (e.g., top left to bottom right), the order in which the objects are stored in the development application memory, the order in which the objects were added to their respective scene, etc. Some embodiments start by selecting objects from the first scene, then select remaining objects from the second scene afterwards. In some cases, the application actually selects all of the objects at once and performs the operations 920-945 in parallel for all objects affected by the animation.

For the selected object, the process 900 performs different operations depending on whether the object is part of only the first scene, only the second scene, or both scenes. The process 900 conceptually illustrates one order for making this determination and performing different operations depending on the determination. One of ordinary skill in the art will recognize that these determinations can be made in a different order in different embodiments, and that this is simply one conceptual illustration of the process performed by some embodiments.

As shown, the process determines (at 920) whether the current graphical object is part of the first scene only (i.e., part of the first scene and not part of the second scene). When this is the case, the process calculates (at 925) one or more exit keyframes for the current object. Some embodiments use a default outro animation for such objects in a transition, such as an explode animation or a fade out animation. In other embodiments, as mentioned, the user selects intro and outro animations for the transition.

In some embodiments, the development application creates a timeline for the transition. That is, the application treats the transition similar to a new scene, with the restrictions that the new scene appears in the developed application between the first scene and the second scene, as opposed to wherever the developer chooses. Furthermore, in some embodiments, the developer may not add graphical objects to or remove graphical objects from the transition, as these are fixed based on which objects are present at the end of the first scene and beginning of the second scene. For objects that are only in the first scene, some embodiments calculate a keyframe for the end of the transition. The object is assumed to have its parameters from the end of the first scene at the start of the transition timeline, and the application generates an exit keyframe (e.g., an opacity of zero for a fade out animation, a position at the edge of the screen for an explode animation, etc.). In some cases, the application will calculate additional keyframes, such as are shown in FIG. 7 for the rotation parameter.

When the object is not only in the first scene, the process determines (at 930) whether the current graphical object is only in the second scene (i.e., part of the second scene and not part of the first scene). When this is the case, the process calculates (at 935) intro keyframes for the current object. Some embodiments use a default intro animation for such objects in a transition, such as an implode animation or a fade in animation. In other embodiments, as mentioned, the user selects intro and outro animations for the transition.

For objects that are only in the second scene, some embodiments calculate a keyframe for the start of the transition. The object is assumed to have its parameters from the start of the second scene at the end of the transition timeline, and the application generates an entrance keyframe (e.g., an opacity of zero for a fade in animation, a position at the edge of the screen for an implode animation, etc.). In some cases, the application will calculate additional keyframes, such as are shown in FIG. 7 for the rotation parameter.

When the current graphical object is not in only the first scene or only the second scene, then the object must be in both of the scenes. When this is the case, the process calculates (at 940) keyframes for the object transitioning from the first scene to the second scene. In some embodiments, these keyframes are simply the parameters of the object at the end of the first scene and the parameters of the object at the start of the second scene. For position parameters, for example, the application will move the object between positions in a straight line over the duration of the transition, so no additional keyframes are necessary. However, some embodiments add additional animation to these objects (e.g., by rotating the objects, etc.), in which case the application needs to calculate additional keyframes.

After calculating the transition keyframes, the process 900 stores (at 945) the keyframe information for the object (i.e., the parameter values at the particular time in the transition). These keyframes are stored in data defining the transition, which in some embodiments is stored in the same manner as scene data (i.e., treating the transition as another scene). This transition data, in some embodiments, is associated in the development application with the scenes for which the transition is generated. Thus, when a developer developing an application indicates that a particular occurrence in the developed application causes the developed application to display the second scene after the first scene (or vice-versa for a bidirectional transition), the development application automatically inserts the transition in between the scenes. Then, when a user of the developed application performs the action causing this sequence of scenes, the animated transition is displayed on the user's device.

After storing the keyframes for the currently selected object, the process 900 determines (at 950) whether additional graphical objects remain for which the process needs to generate transition keyframes. When additional objects remain, the process returns to 915 to select the next object. Once the process 900 has evaluated all of the objects, the process ends.

The fourth stage of FIG. 10 illustrates that the application has created a transition and now displays a transition item 1016 between the first scene item 1017 and the second scene item 1018. Because there are no keyframes in the middle of this transition, the transition item 1016 appears as a connector between the scene items 1017 and 1018 with keyframe indicators on both of its ends.

Figure 11:
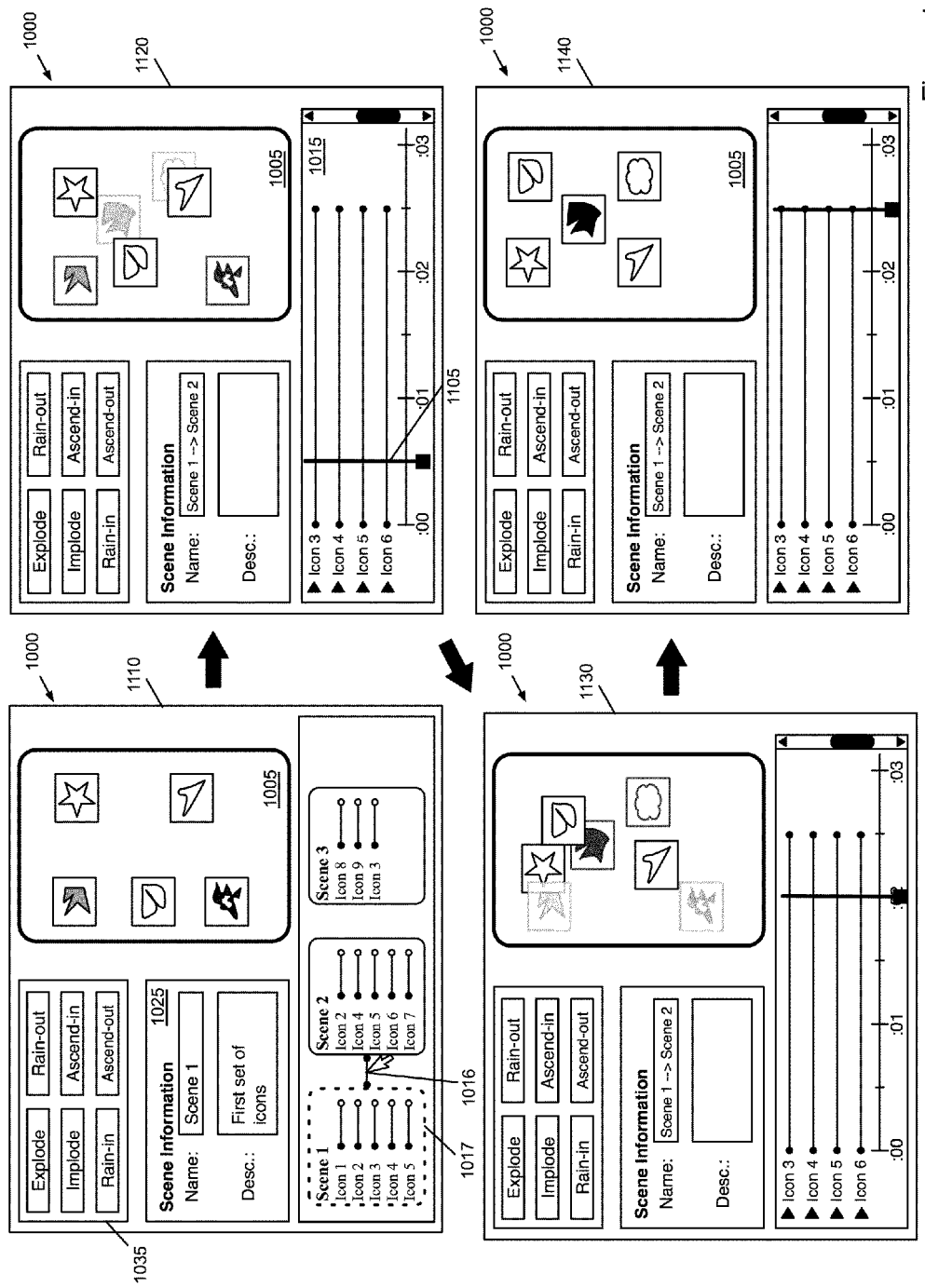
FIG. 11 illustrates the user interface in four stages as a user of the development application views a timeline of the transition and moves through the transition animation generated in FIG. 10.

FIG. 11 illustrates the user interface 1000 in four stages 1110-1140 as a user of the development application views a timeline of the transition and moves through the transition animation generated in FIG. 10. As shown at stage 1110, the user has previously selected the first scene item 1017, so this scene is shown in the scene display area 1005. The user has also placed a cursor over the transition item 1016. In some embodiments, selecting such a transition item (e.g., with a double-click, a double-tap, etc.) causes the application to display timelines for the transition in the timeline display area.

Stage 1120 illustrates the result of the user making such a selection of the transition item 1016, as object timelines for the graphical objects of both the first and second scenes are now shown in the timeline display area 1015. The timeline display area is not large enough to display timelines for all seven of the objects at once, but currently shows timelines for the objects 1008, 1009, 1011, and 1012.

At this stage, the playhead 1105 is at the 0.5 second mark of the transition. The transition uses a fade out animation for the objects that are only in the first scene, and thus the objects 1006 and 1008 are at 80% opacity (because the playhead is 20% of the way through the transition duration). Conversely, the transition uses a fade in animation for the objects that are only in the second scene, and thus the objects 1012 and 1013 are at 20% opacity. For the objects in both scenes, the transition animates the objects by moving them from their position at the end of the first scene to their position at the end of the second scene. As such, the objects 1007, 1009, and 1011 are one fifth of the way along their respective paths at this stage.

The third stage 1130 illustrates the transition now that the playhead has moved to the 2.0 second mark (e.g., because the application is playing through the transition at a real-time rate, the user is moving the playhead, etc.). At this stage, the objects 1006 and 1008 (fading out) are at 20% opacity while the objects 1012 and 1013 (fading in) are at 80% opacity. The objects 1007, 1009, and 1011 have moved four fifths of the way along their respective paths. Finally, the fourth stage 1140 illustrates the end of the transition. At this point, the scene display area 1005 displays only the objects in the second scene, and displays them at their location at the beginning of that scene.

This figure illustrates object timelines for the transition that are similar to the object timelines for the scenes shown in the previous section. In some embodiments, a user of the development application may manually edit transitions after the application has automatically created the transition in the same way that the user can manually edit scenes (either modifying an automatically generated animation or creating a user-generated animation) as shown in FIG. 8.

In some embodiments, as mentioned above, the timeline view illustrated in FIG. 10 (showing multiple scenes) can be used as a global timeline that allows a user of the application to view a set of scenes ordered within the developed application and play through these scenes in order to view how the scenes flow together. The user can create transitions (as shown above), link scenes, etc. Some embodiments also enable the timeline to illustrate branching (i.e., when a first scene transitions into either a second scene or third scene (or one of more than two different scenes) depending on user action within the first scene).

Figure 12:
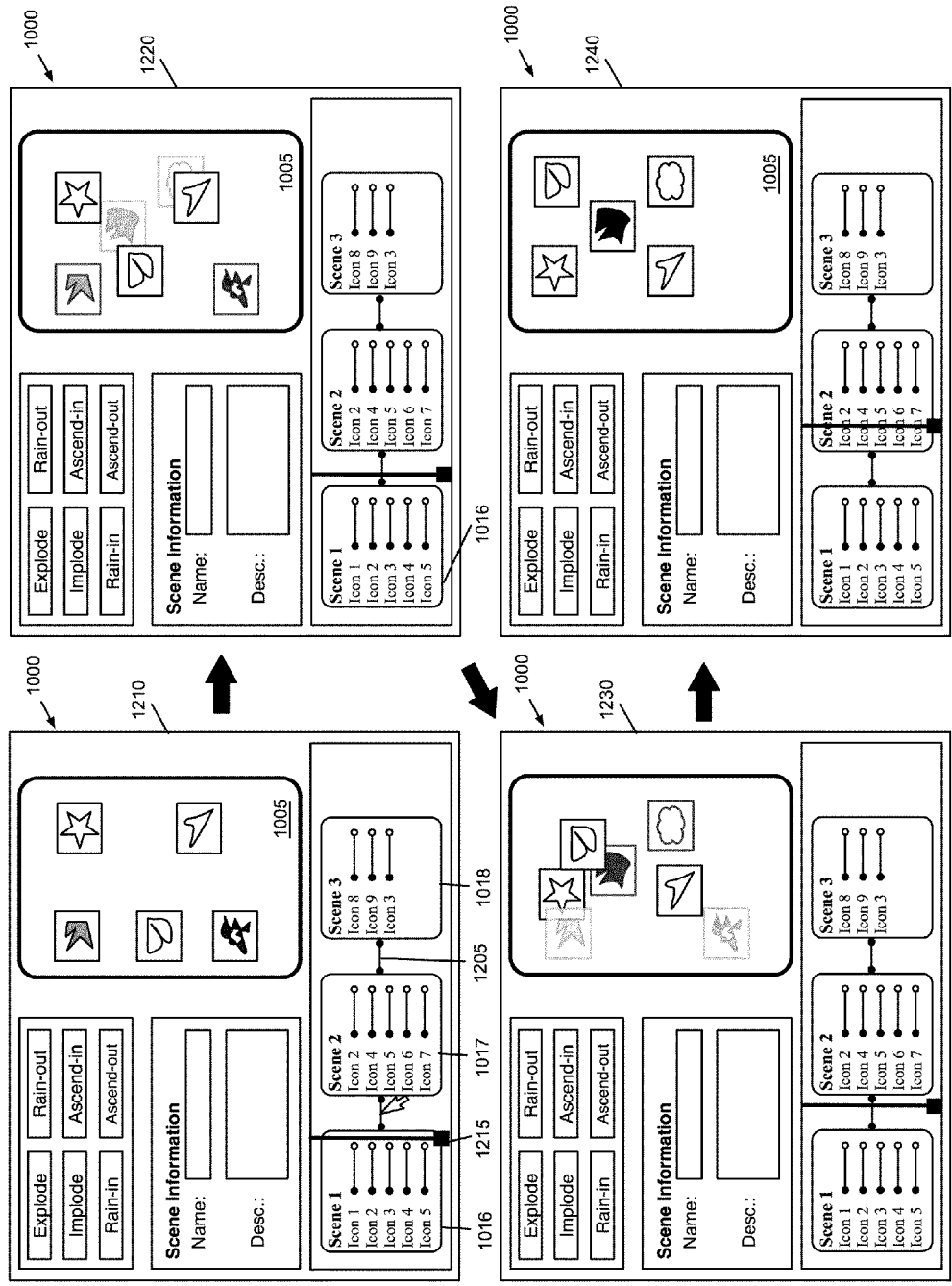
FIG. 12 illustrates the use of a global timeline over four stages.

FIG. 12 illustrates the user of such a global timeline in the user interface 1000 over four stages 1210-1240. In this figure, a transition item 1205 is displayed between the scene items 1017 and 1018 to indicate a transition between the second and third scenes. As described above, some automatically generated animations are intro and outro animations. The app-development application of some embodiments uses these intro and outro animations as the transitions between scenes when a user links two scenes and inserts a transition. When no such animations exist, the application uses a process such as that shown in FIG. 9 to automatically generate a transition between the scenes.

The first stage 1210 of FIG. 12 illustrates that a playhead 1215 is currently shown over the end of the first scene in the timeline display area 1015. At this point within the scene, the graphical objects of the scene have the same parameters as at the end of the scene, and thus the scene display area 1005 shows these objects at the same locations as at stage 1110 of FIG. 11.

The next two stages 1220 and 1230 show the playhead 1215 moving through the transition between the first and second scenes, and correspond to stages 1120 and 1130 of FIG. 11. The graphical objects from the first stage are fading out of the display during these stages, while the graphical objects from the second stage are fading in and the shared objects move from their locations at the end of the first scene to their locations at the start of the second scene.

The fourth stage 1240 illustrates that the playhead 1215 is now part of the way into the second scene, and thus the objects from the second scene are displayed. This scene does not have any internal animation, and thus the objects have the same parameters as at the start of the scene. The user could, however, drill down into the scene in the timeline and generate animation for the scene.

The above section describes a process 900 that automatically generates a transition between two scenes by automatically defining animations for the objects in the scenes (including objects only in the first scene, objects only in the second scene, and objects common to the two scenes). Some embodiments provide a variety of different options for transitioning between scenes. For example, if no transition is defined, but a second scene follows a first scene, then in some embodiments any outro defined for the first scene is sequentially followed by any intro for the second scene (i.e., not playing at the same time).

When a user adds a transition between the first scene and second scene, and no intro or outro animation is defined, then some embodiments perform the process 900 to automatically generate transition animation for the objects. As mentioned, to generate a transition between the two scenes, some embodiments simultaneously perform the outro for objects animated in the first scene and the intro for objects animated in the second scene, while automatically adding transition animation for objects that are otherwise not animated (e.g., if the intro or outro does not animate all objects).

However, objects may also be in both scenes, preventing the application from using the intro and outro simultaneously. Some embodiments use the intro and outro animations for objects in only one of the two scenes, but automatically generate new animations for the objects in both scenes. These animations for the common objects might be based off of the intro and outro animations or be completely new animations. Some embodiments may also present the developer with various options or provide a more customizable transition—e.g., whether to use the intro, outro, or a new animation for common objects, etc.

III. Graphical User Interface

Many of the above figures illustrate graphical user interfaces (GUIs) for an application-building application (also referred to as an application-development application). One of ordinary skill in the art will recognize that different embodiments will include different GUIs that provide some or all of the functionalities described in the above sections.

Figure 13:
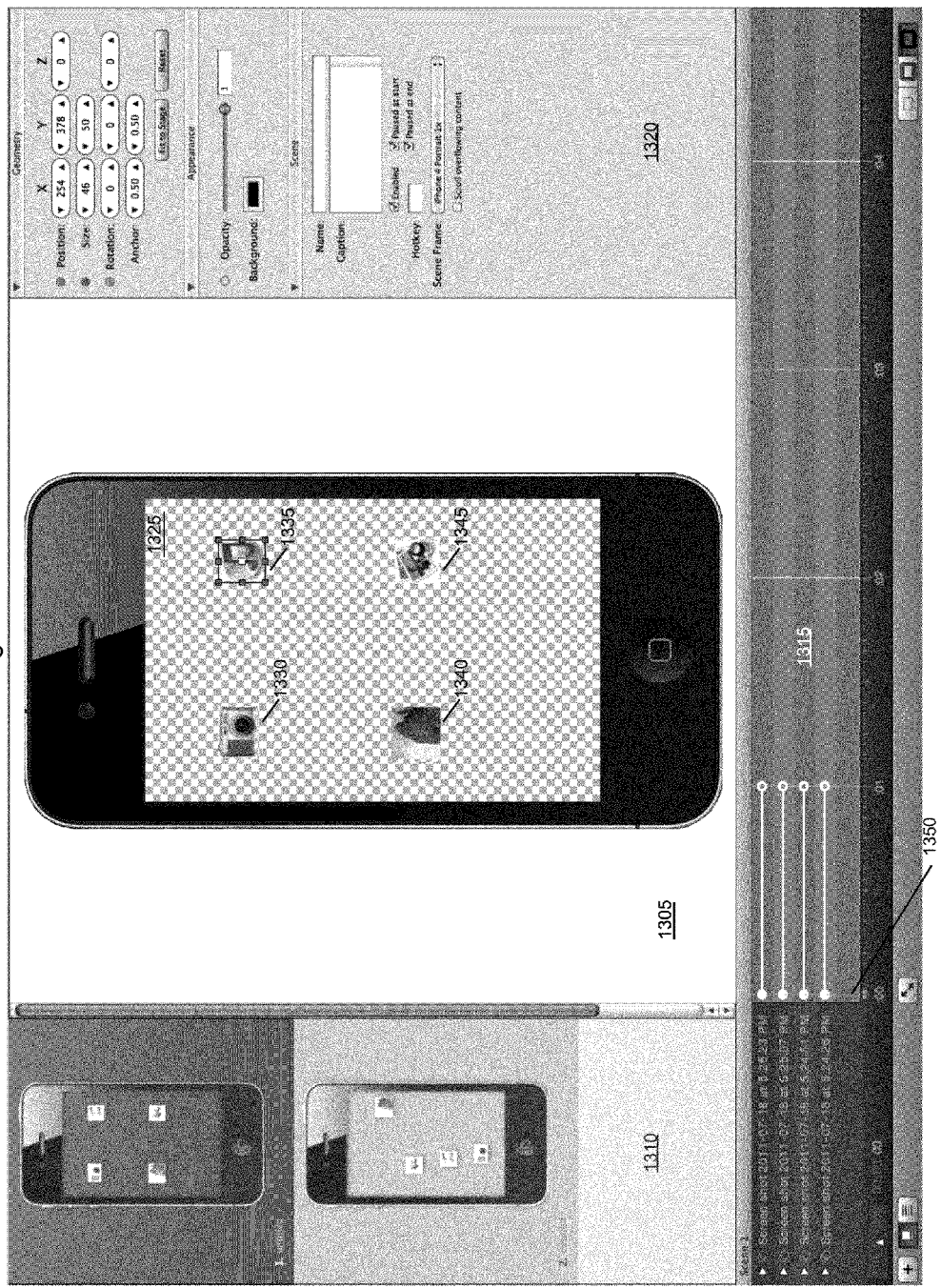
FIG. 13 illustrates an example of a graphical user interface for an application-development application.

FIG. 13 illustrates an example of such a graphical user interface 1300 for an application-development application. The graphical user interface includes a scene display area 1305, a scene selection display area 1310, a timeline display area 1315, and an information display area 1320. The scene display area 1305 displays an image of a device, with the scene shown on the screen 1325 of the device. This enables the user of the application to see how the application he is developing will appear on the device for which that application is being developed. In this figure, the device shown is an iPhone, but some embodiments may display other devices or give the user a choice of devices (e.g., other smart phones, tablets, different resolution desktops, etc.).

In the GUI 1300, the device screen 1325 displays four graphical objects 1330-1345. One of these graphical objects 1335 is currently selected, and the application displays on-screen controls through which a user can modify parameters of the selected object. In addition to grabbing the object and moving it on the device screen 1325, the user can resize the object with the outer handles. In some embodiments, the user can also move the anchor of the object and rotate the object within the x-y plane (about the z axis) through on-screen controls.

The scene selection display area 1310 displays small versions of each of the scenes created by the user for a particular application being developed, or within a particular scene creation session. Some embodiments store files particular to the app-building application, and each of these files contains one or more scenes. The developer may store all scenes for a particular application being developed in a single file or spread these out among multiple files (e.g., different files for different portions of the application). In the example shown in this figure, the scene selection display area 1310 includes two scenes between which the developer may select. At the moment, the first scene (i.e., the top scene in the display area 1310) is selected, and therefore the application displays this scene in the scene display area 1305. In some embodiments, a developer can use this display area to create transitions between scenes in a similar manner to that shown in FIG. 10 (e.g., by dragging from one scene to the next, selecting two scenes and then selecting an item from a menu, etc.).

The timeline display area 1315 displays object timelines for the four objects 1330-1345 shown on the device screen 1325. In some embodiments, these object timelines can be expanded to show timelines for the different parameters, as illustrated in FIG. 6. The user can move the playhead 1350 along the timeline in order to display a different time in the duration of the scene in the display area 1305 and to make edits to the object parameters for that time.

The information display area 1320 includes object parameter information (split into two different sections for object geometry and object appearance, and which may also include a section for object behavior) and scene information. The object geometry allows a user to directly modify the position, size, rotation, and anchor coordinates for a selected object, as shown in FIG. 8.

The object appearance parameters that a user can modify include the opacity and the background color. The slider for modifying opacity is described above by reference to FIG. 8. In some embodiments, graphical objects include a background area, the color of which can be modified using the background item shown in the display area 1320. Selecting this item, in some embodiments, causes the application to display a color palette that the user may use to select a new color.

Finally, the scene information includes a scene name field, a scene caption field, a set of checkboxes, a hotkey input field, and a scene frame drop-down menu. The scene name field allows the user to name the scene, a modification which is reflected in the scene selection display area 1310 (which currently lists both scenes as untitled). The caption field allows the user to describe the scene (e.g., a description of what happens, what causes the scene in the developed application, etc.). The set of checkboxes enable the user to select whether the scene is enabled and whether the scene is paused at the start and/or finish. The scene frame menu of some embodiments allows a user to select which device screen is displayed in the scene display area 1305 (e.g., the currently selected iPhone 4 in portrait orientation, the iPhone 4 in landscape orientation, or other devices in different orientations).

Unlike the GUIs shown in the above figures, the GUI 1300 does not include a specific display area for displaying selectable animation items. In some embodiments, this is a display area that can be toggled, and appears as part of the information display area when toggled on. In other embodiments, animations are selected from a standard drop-down menu or in some other fashion.

IV. App-Development Application

Figure 14:
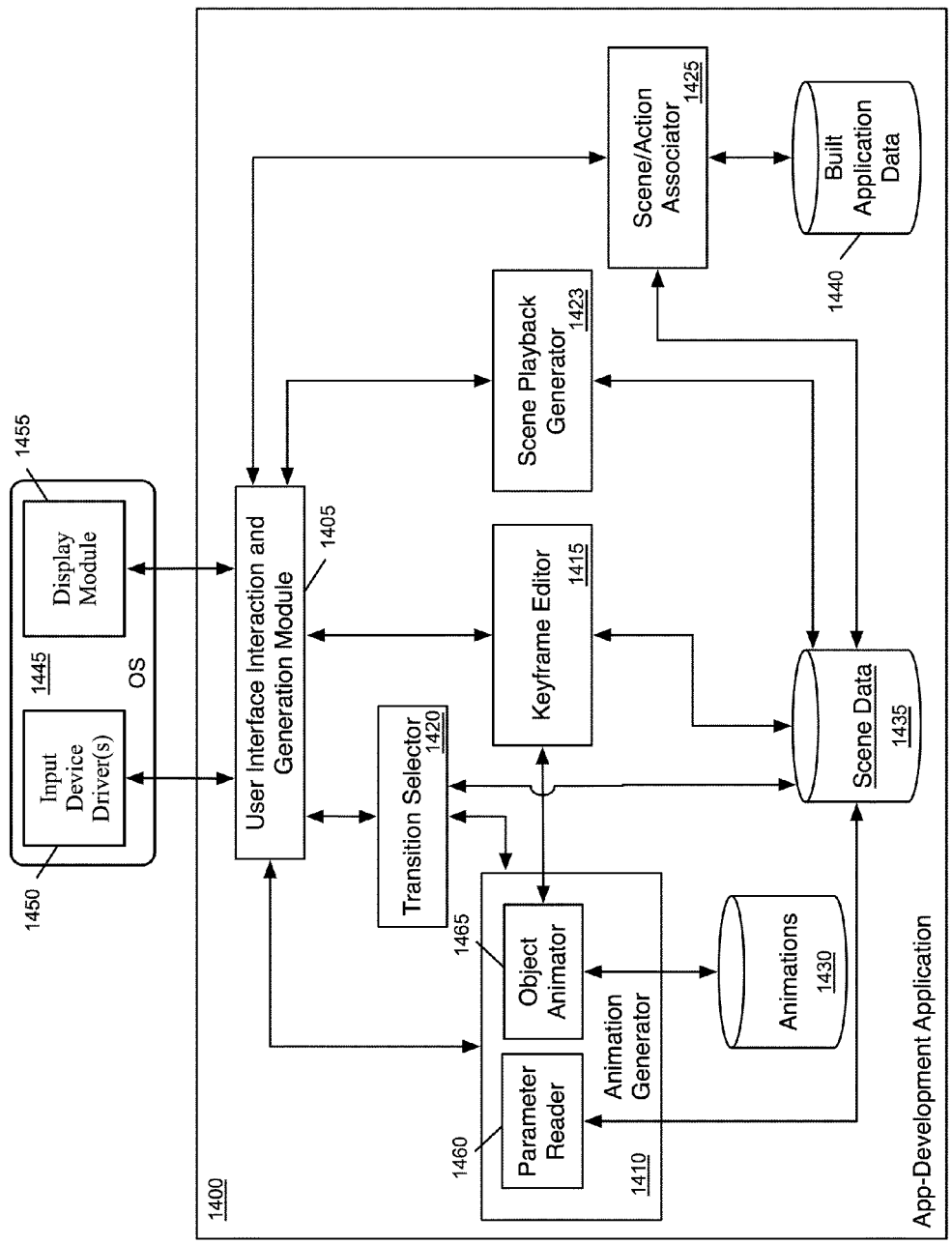
FIG. 14 conceptually illustrates the software architecture of an application-development application of some embodiments.

In some embodiments, the processes described above are implemented as software running on a particular machine, such as a computer or a handheld device, or stored in a machine readable medium. FIG. 14 conceptually illustrates the software architecture of an application-development application 1400 of some embodiments. In some embodiments, the app-development application is a stand-alone application or is integrated into another application (e.g., a compositing application), while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The app-development application 1400 includes a user interface (UI) interaction and generation module 1405, an animation generator 1410, a keyframe editor 1415, a transition selector 1420, a scene playback generator 1423, and a scene/action associator 1425. The app-building application also stores animations data 1430, scene data 1435, and built application data 1440. The animations data of some embodiments stores information for one or more pre-determined animations that the application applies to graphical objects in a scene. In some embodiments, each animation is stored as a set of instructions for modifying parameters of the graphical objects to which it is applied. These instructions may modify a parameter of an object based on the value of the parameter, the values of other parameters of the object, the values of parameters of other objects, parameters specific to the scene of which the object is a part, or combinations thereof. As a result, a particular animation may modify a particular parameter of a first object in a scene differently from the particular parameter of a second object in the scene.

The scene data 1435 stores information about various scenes created using the app-building application 1400. In some embodiments, this scene information includes the graphical objects in a scene as well as all parameter keyframes for those graphical objects. The built application data 1440 stores information for developed applications. That is, the built app data 1440 stores the information required to build a working application: data about behaviors associated with graphical objects, data about how scenes connect together and which actions cause the display of particular scenes, etc.

In some embodiments, data 1430-1440 is all stored in one physical storage. In other embodiments, the data are in separate physical storages, or two of the sets of data are in one physical storage while the third is in a different physical storage. For instance, the animations data 1430 might be stored in one storage, while the user-generated scene data 1435 and built app data 1440 are stored in a different storage.

FIG. 14 also illustrates an operating system 1445 that includes input device driver(s) 1450 and display module 1455. In some embodiments, as illustrated, the device drivers 1450 and display module 1455 are part of the operating system 1445 even when the app-development application 1400 is an application separate from the operating system.

The input device drivers 1450 may include drivers for translating signals from a keyboard, mouse, touchpad, tablet, touchscreen, etc. A user interacts with one or more of these input device, which send signals to their corresponding device driver. The device driver then translates the signals into user input data that is provided to the UI interaction and generation module 1405.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 1455 translates the output of a user interface for a display device. That is, the display module 1455 receives signals (e.g., from the UI interaction and generation module 1405) describing what should be displayed and translates these signals into pixel information that is sent to the display device. The display device may be an LCD, plasma screen, CRT monitor, touchscreen, etc.

The UI interaction and generation module 1405 of media editing application 1400 interprets the user input data received from the input device drivers and passes it to various modules, including the animation generator 1410, the keyframe editor 1415, the transition selector 1420, etc. The UI interaction module also manages the display of the UI, and outputs this display information to the display module 1455. This UI display information may be based on information from the scene playback generator 1423, as well as other modules of the application 1400. In addition, the module 1405 may generate portions of the UI based just on user input—e.g., when a user moves an item in the UI that only affects the display rather than any of the other modules, such as sliding a scrollbar, changing sizes of display areas, etc.

The animation generator 1410 of some embodiments generates animations for one or more graphical objects in a scene according to a set of instructions. As shown, the animation generator 1410 includes a parameter reader 1460 and an object animator 1465. The parameter reader 1460 receives a set of graphical objects to which a particular animation will be applied, and reads object parameters from the scene data 1435. The object animator 1465 retrieves the information for the requested animation from the animations data 1430 (e.g., an algorithm for calculating keyframes for various parameters at various times in a scene) and applies this information to the scene, accounting for the location of the playhead in a timeline of the scene, etc. The object animator 1465 determines when the keyframes should be calculated for which parameters and the values of those parameters at the keyframes.

The keyframe editor 1415 receives keyframe information (i.e., the value of a particular parameter for a particular object at a particular time in a particular scene) and modifies the data for the particular scene to include a keyframe with this information. The keyframe editor 1415 may receive the object parameter information from the object animator 1465 of the animation generator 1410 or directly from the UI interaction module 1405 when a user directly modifies a parameter (e.g., through UI items, the graphical objects themselves, etc.).

The transition selector 1420 receives a request for a transition between two scenes from the UI interaction module 1405. With this information (i.e., the scenes and any additional input given with the transition), the transition selector retrieves scene information from the scene data 1435, creates a new "scene" for the transition, and selects animations to apply to the different graphical objects. This selection may be based on the object parameters, whether the objects are in one or both scenes, or user input. The transition selector passes this information to the animation generator 1410 so that the animation generator can automatically generate any necessary keyframes for the transition animation.

The scene playback generator 1423 uses the scene data to generate a playback of the scene in the application GUI. The playback generator identifies the objects in the scene, the times for which images need to be generated (i.e., the time of the playhead in the user interface in order to generate the scene display area, the entire duration of a scene if the scene is being played back in real time), and the keyframes. Using this information, the playback generator interpolates values for all of the parameters of the scene objects at the needed scene times, and outputs this information to the UI generation module 1405.

The scene/action associator 1425 is one of the modules of the app-development application 1400 for creating a functional application. The scene/action associator of some embodiments enables a developer to associate a particular scene (whether animated or not) with a particular action taken by a user of the developed app. That is, the scene/action associator allows a user to associate the selection of a particular graphical object in the developed app with a scene displayed as a result of that selection. Other modules enable a user to associate behaviors with graphical objects and other functions needed to create a working application.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
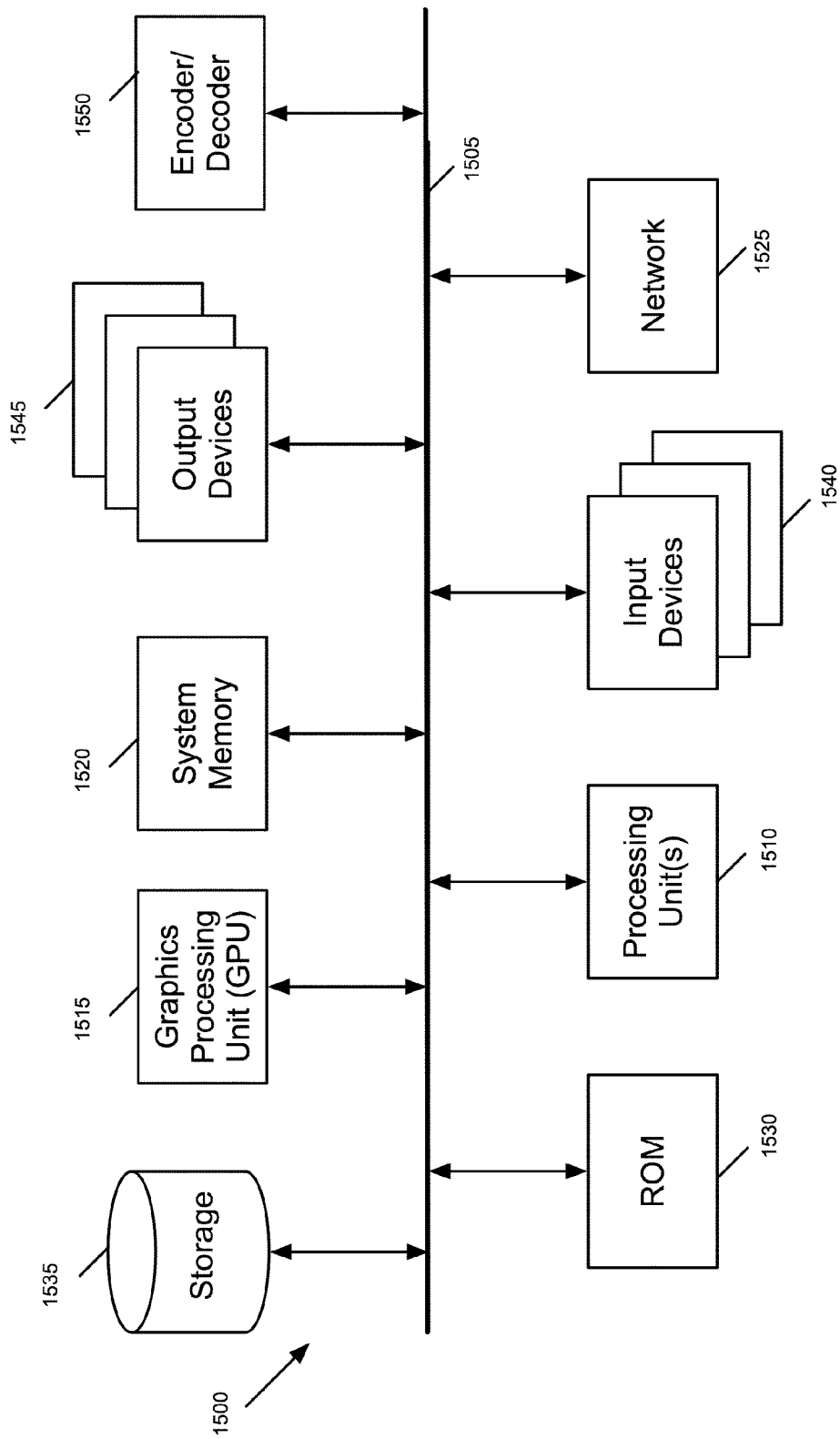
FIG. 15 conceptually illustrates an electronic system with which some embodiments of the invention are implemented.

FIG. 15 conceptually illustrates an electronic system 1500 with which some embodiments of the invention are implemented. The electronic system 1500 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1500 includes a bus 1505, processing unit(s) 1510, a graphics processing unit (GPU) 1515, a system memory 1520, a network 1525, a read-only memory 1530, a permanent storage device 1535, input devices 1540, output devices 1545, and encoder/decoder (codec) hardware 1550.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the GPU 1515, the system memory 1520, and the permanent storage device 1535.

From these various memory units, the processing unit(s) 1510 retrieves instructions to execute and data to process in order to execute the processes of the invention. The processing unit(s) may be a single processor or a multi-core processor in different embodiments. Some instructions are passed to and executed by the GPU 1515. The GPU 1515 can offload various computations or complement the image processing provided by the processing unit(s) 1510. In some embodiments, such functionality can be provided using CoreImage's kernel shading language.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash memory device, etc., and its corresponding drive) as the permanent storage device. Like the permanent storage device 1535, the system memory 1520 is a read-and-write memory device. However, unlike storage device 1535, the system memory 1520 is a volatile read-and-write memory, such as a random access memory. The system memory 1520 stores some of the instructions and data that the processor needs at runtime. In some embodiments, the invention's processes are stored in the system memory 1520, the permanent storage device 1535, and/or the read-only memory 1530. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alphanumeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices and physical devices that can produce vibration emissions (e.g., the vibrating electronics in a smart phone). Some embodiments include devices such as a touchscreen that function as both input and output devices.

The codec 1550 is a hardware device (e.g., a chip such as an application-specific integrated circuit (ASIC) or card) designed specifically for encoding and decoding video images. Sequences of unencoded images are sent to the codec 1550 so that the images can be encoded (e.g., for transmission or storage). Additionally, the codec decodes encoded images (e.g., from a file or received through the network 1525) into pixel data for the system to display on the output devices 1545.

Finally, as shown in FIG. 15, the bus 1505 also couples electronic system 1500 to a network 1525 through a network adapter (not shown). In this manner, the electronic system can be a part of a network of such systems (such as a local area network ("LAN"), a wide area network ("WAN"), an Intranet, or a network of networks, such as the Internet). Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of this specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 2 and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A computer readable medium storing a computer program for execution by at least one processing unit, the computer program comprising sets of instructions for:
   receiving a selection of an animation to apply to two or more graphical objects in a scene over a particular time duration;
   identifying positional parameters for each of the graphical objects, the positional parameters describing the location of the graphical objects within the scene;
   based on the selected animation, generating modifications to the positional parameter for each of the graphical objects over the particular time duration, wherein the positional parameter of a first graphical object is modified differently by the selected animation than the positional parameter of a second graphical object is modified by the same selected animation; and
   storing the modifications as data for the scene.

2. The computer readable medium of claim 1, wherein the computer program is an app-development application and the scene is for use in development of an app.

3. The computer readable medium of claim 2, wherein the app is for operating on a particular device.

4. The computer readable medium of claim 1, further comprising:
   identifying an opacity parameter for each of the graphical objects.

5. The computer readable medium of claim 1, wherein generating a modification to a positional parameter over the duration comprises generating a keyframe for the positional parameter at a first time in the duration, wherein a second keyframe is previously generated for a second time in the duration.

6. The computer readable medium of claim 5, wherein the first time is the start of the duration and the second time is the end of the duration, wherein the selected animation causes the graphical object to enter the scene.

7. The computer readable medium of claim 5, wherein the first time is the start of the duration and the second time is the end of the duration, wherein the selected animation causes the graphical object to exit the scene.

8. The computer readable medium of claim 1, wherein generating the modification to the positional parameter over the duration comprises generating a plurality of keyframes for the positional parameter at a plurality of different times over the duration.

9. The computer readable medium of claim 1, wherein the parameter of a first graphical object is modified differently than the parameter of a second graphical object based on a z-axis parameter for the one or more graphical objects, wherein the z-axis is perpendicular to the scene.

10. A computer-implemented method comprising:
    providing, using a processing unit, a first display area for displaying a plurality of graphical objects arranged in a scene having a duration, each graphical object having a set of associated parameters;
    providing, using a processing unit, a second display area for displaying timelines for the graphical objects over the duration of the scene, wherein the timeline for a particular object indicates specific times in the scene at which a positional parameter of the object has a set value, the positional parameter describing the location of the graphical objects within the scene; and
    providing, using a processing unit, a tool for applying an animation to one or more objects in the scene, wherein the animation sets new positional parameter values for the objects for at least one specific time in the scene in such a way that the positional parameter value for a first object is modified differently by the selected animation than the positional parameter value for a second object is modified by the same selected animation.

11. The computer-implemented method of claim 10, wherein the specific times are keyframes for the positional parameters of the object.

12. The computer-implemented method of claim 10 further comprising providing a third display area for displaying the tool along with other tools for applying different animations to the objects in the scene.

13. The computer-implemented method of claim 10 further comprising providing a third display area for displaying modifiable parameter values for a particular time indicated by a playhead in the timeline, the displayed parameter values modifiable in order to set parameter values for a particular object at the particular time.

14. The computer-implemented method of claim 10, wherein the parameter of a first object is modified differently than the parameter of a second object based on a z-axis parameter for the one or more graphical objects, wherein the z-axis is perpendicular to the scene.

15. A computer readable medium storing a computer program for execution by at least one processing unit, the computer program comprising sets of instructions for:
    receiving a selection of a first scene comprising a first set of graphical objects and a second scene comprising a second set of graphical objects;
    identifying positional parameters of the first set of graphical objects at the end of the first scene and positional parameters of the second set of graphical objects at the beginning of the second scene, the positional parameters describing the location of the graphical objects within the scene;

automatically generating a transition animation between the first scene and the second scene in which a particular positional parameter of a first graphical object is modified differently by the selected animation than the particular positional parameter of a second graphical object is modified by the same selected animation.

16. The computer readable medium of claim 15, wherein the first graphical object is in the first and second sets, wherein over the duration of the transition animation the parameters of the first graphical object change from values at the end of the first scene to values at the beginning of the second scene.

17. The computer readable medium of claim 15, wherein the parameter of a first graphical object is modified differently than the parameter of a second graphical object based on a z-axis parameter for the one or more graphical objects, wherein the z-axis is perpendicular to the scene.

18. A system comprising:
an input device configured to receive a selection of an animation to apply to two or more graphical objects in a scene over a particular time duration;
a processing unit configured to identify positional parameters for each of the graphical objects, the positional parameters describing the location of the graphical objects within the scene;
wherein the processing unit is further configured to generate, based on the selected animation, modifications to the positional parameter for each of the graphical objects over the particular time duration, wherein the positional parameter of a first graphical object is modified differently by the selected animation than the positional parameter of a second graphical object is modified by the same selected animation and
wherein the processing unit is further configured to store the modifications as data for the scene.

19. The system of claim 18, wherein the computer program is an app-development application and the scene is for use in development of an app.

20. The system of claim 18, wherein the app is for operating on a particular device.

21. The system of claim 18, wherein the processing unit is further configured to identify an opacity parameter for each of the graphical objects.

22. The system of claim 18, wherein generating a modification to a positional parameter over the duration comprises generating a keyframe for the positional parameter at a first time in the duration, wherein a second keyframe is previously generated for a second time in the duration.

23. The system of claim 22, wherein the first time is the start of the duration and the second time is the end of the duration, wherein the selected animation causes the graphical object to enter the scene.

24. The system of claim 22, wherein the first time is the start of the duration and the second time is the end of the duration, wherein the selected animation causes the graphical object to exit the scene.

25. The system of claim 18, wherein generating the modification to the positional parameter over the duration comprises generating a plurality of keyframes for the positional parameter at a plurality of different times over the duration.

26. The system of claim 18, wherein the parameter of a first graphical object is modified differently than the parameter of a second graphical object based on a z-axis parameter for the one or more graphical objects, wherein the z-axis is perpendicular to the scene.

27. The system of claim 18, wherein the processing unit comprises a graphical processing unit.

* * * * *